US011910795B2

United States Patent
Liu et al.

(10) Patent No.: US 11,910,795 B2
(45) Date of Patent: Feb. 27, 2024

(54) NATURAL INDOLE AUXIN AND AMINOPOLYCARBOXYLIC ACID HERBICIDAL COMPOSITIONS

(71) Applicant: Suncor Energy Inc., Calgary (CA)

(72) Inventors: Jun Liu, Oakville (CA); Michael Fefer, Whitby (CA)

(73) Assignee: Suncor Energy Inc., Calgary (CA)

(*) Notice: Subject to any disclaimer, the term of this patent is extended or adjusted under 35 U.S.C. 154(b) by 0 days.

(21) Appl. No.: 17/513,810

(22) Filed: Oct. 28, 2021

(65) Prior Publication Data

US 2022/0046920 A1   Feb. 17, 2022

Related U.S. Application Data

(63) Continuation of application No. 14/376,006, filed as application No. PCT/CA2014/050259 on Mar. 14, 2014, now abandoned.

(60) Provisional application No. 61/793,914, filed on Mar. 15, 2013.

(51) Int. Cl.
    *A01N 43/38* (2006.01)
    *A01N 37/44* (2006.01)

(52) U.S. Cl.
    CPC ............. *A01N 43/38* (2013.01); *A01N 37/44* (2013.01)

(58) Field of Classification Search
    CPC ........ A01N 25/02; A01N 37/44; A01N 43/03; A01N 43/38
    USPC ........................................................ 504/138
    See application file for complete search history.

(56) References Cited

U.S. PATENT DOCUMENTS

| | | | |
|---|---|---|---|
| 3,877,921 A * | 4/1975 | Timmons | A01N 43/76 504/179 |
| 5,002,962 A | 3/1991 | Pandey et al. | |
| 5,913,884 A | 6/1999 | Trauner et al. | |
| 5,976,535 A | 11/1999 | Fritzberg et al. | |
| 6,015,897 A | 1/2000 | Theodore et al. | |
| 6,036,941 A | 3/2000 | Bottiroli et al. | |
| 6,123,923 A | 9/2000 | Unger et al. | |
| 6,217,869 B1 | 4/2001 | Meyer et al. | |
| 6,498,945 B1 | 12/2002 | Alfheim et al. | |
| 8,449,917 B2 * | 5/2013 | Dave | A01N 25/12 504/307 |
| 2002/0098161 A1 | 7/2002 | Uhrich | |
| 2002/0137901 A1 | 9/2002 | Cavanaugh | |
| 2002/0183245 A1 | 12/2002 | Hasan et al. | |
| 2003/0050296 A1 | 3/2003 | Boomer et al. | |
| 2004/0162239 A1 | 8/2004 | Allan et al. | |
| 2004/0266748 A1 | 12/2004 | Robinson et al. | |
| 2005/0020559 A1 | 1/2005 | Robinson et al. | |

(Continued)

FOREIGN PATENT DOCUMENTS

| | | | | |
|---|---|---|---|---|
| CA | 2833190 A1 * | 11/2012 | | A01N 25/00 |
| CN | 104513250 | 4/2015 | | |

(Continued)

OTHER PUBLICATIONS

Srivastava, L. M.,2002, Plant growth and development : Hormones and environment, Chapter 6, pp. 155-169.*

(Continued)

*Primary Examiner* — Carlos A Azpuru
(74) *Attorney, Agent, or Firm* — Fish & Richardson P.C.

(57) ABSTRACT

This disclosure features herbicidal compositions including one or more indole auxins and methods of making and using the same.

19 Claims, 7 Drawing Sheets

Table 1.

| Tr No. | Treatment | 0 DAT Grass | 0 DAT Dandelion | 6 DAT Grass | 6 DAT Dandelion | 14 DAT Grass | 14 DAT Dandelion | 28 DAT Grass | 28 DAT Dandelion |
|---|---|---|---|---|---|---|---|---|---|
| 1 | untreated control | 0 | 0 | 0 | 0 | 1 | 0 | 0 | 0 |
| 2 | 1.5%IBA-K | 0 | 0 | 1 | 3 | 5 | 4 | 0 | 3 |
| 3 | 2% DTPA-Na5 | 0 | 0 | 1 | 3 | 1 | 4 | 0 | 4 |
| 4 | 1.5%IBA-K+2%DTPA-Na5 | 0 | 0 | 1 | 6 | 2 | 8.5 | 0 | 9 |
| 5 | 1.5%IBA-K+2%DTPA-Na5+2%Polyethylene glycol 200 | 0 | 0 | 2 | 8 | 4 | 9 | 3 | 10 |
| 6 | 0.5%IBA-K+2%DTPA-Na5+2%Polyethylene glycol 200 | 0 | 0 | 1 | 9 | 2.5 | 9 | 0 | 9 |
| 7 | 1.5%IBA-K+2%DTPA-Na5+5%Propylene glycol | 0 | 0 | 2 | 8 | 3 | 9 | 0 | 9.5 |
| 8 | 1.5%IBA-K+1.5%DTPA-Na5+2%Polyethylene glycol 200+0.2% paraffin oil+0.3%alcohol ethoxylate | 0 | 0 | 3 | 6.5 | 3 | 9 | 0 | 9.5 |
| 9 | 1.5%IBA-K+1%DTPA-Na5+5%Propylene glycol+0.4%paraffin oil+0.6%alcohol ethoxylate | 0 | 0 | 3 | 7.5 | 4 | 9 | 0 | 9 |
| 10 | 1.5%IBA-K+2%DTPA-Na5+0.4%paraffin oil+0.6%alcohol ethoxylate | 0 | 0 | 4 | 10 | 6 | 10 | 6 | 10 |
| 11 | 1.5%IAA-K+1.5%HEDTA-Na3+2%Polyethylene glycol 200 | 0 | 0 | 4 | 9 | 3 | 9 | 0 | 9.5 |
| 12 | 1.5%IBA-K+1.5%HEDTA-Na3 | 0 | 0 | 1 | 4 | 3 | 7 | 0 | 7 |
| 13 | 1.5%IBA-K+1.5%HEDTA-Na3+2%Polyethylene glycol 200 | 0 | 0 | 3 | 5 | 2.5 | 8.5 | 0 | 8.5 |
| 14 | 1.5%IBA-K+2.5%HEDTA-na3+0.4%paraffin oil+0.6%alcohol ethoxylate | 0 | 0 | 8 | 9 | 8 | 9.5 | 5 | 10 |

(56) References Cited

U.S. PATENT DOCUMENTS

| | | | |
|---|---|---|---|
| 2005/0074414 A1 | 4/2005 | Tamarkin et al. | |
| 2006/0105974 A1 | 5/2006 | Lange et al. | |
| 2007/0213500 A1 | 9/2007 | Uhrich | |
| 2007/0281878 A1 | 12/2007 | Gottschalk-Gaudig et al. | |
| 2008/0193431 A1 | 8/2008 | Zheng et al. | |
| 2009/0175873 A1 | 7/2009 | Liu | |
| 2009/0215851 A1 | 8/2009 | Van Der Haas et al. | |
| 2009/0220430 A1 | 9/2009 | Rajopadhye et al. | |
| 2010/0009970 A1 | 1/2010 | Johansen et al. | |
| 2010/0218282 A1 | 8/2010 | Nguyen et al. | |
| 2010/0228343 A1 | 9/2010 | Brandom et al. | |
| 2010/0251416 A1 | 9/2010 | Puzio et al. | |
| 2010/0323897 A1* | 12/2010 | Burke | A01N 25/30 206/524.1 |
| 2011/0269628 A1 | 11/2011 | Gewehr et al. | |
| 2012/0070377 A1 | 3/2012 | Yahioglu et al. | |
| 2012/0149572 A1 | 6/2012 | Gewehr et al. | |
| 2012/0197179 A1 | 8/2012 | Khan et al. | |
| 2013/0172185 A1 | 7/2013 | Wei | |
| 2013/0224874 A1 | 8/2013 | Vinogradov et al. | |
| 2013/0231604 A1 | 9/2013 | Jones et al. | |
| 2014/0066449 A1 | 3/2014 | Stewart | |
| 2015/0225723 A1 | 8/2015 | Na et al. | |
| 2015/0296801 A1 | 10/2015 | Brahm et al. | |
| 2016/0177028 A1 | 6/2016 | Bolikal et al. | |
| 2016/0205925 A1 | 7/2016 | Nisnevitch et al. | |
| 2016/0243172 A1 | 8/2016 | Cook et al. | |
| 2017/0037427 A1 | 2/2017 | Evdokimov et al. | |
| 2017/0119908 A1 | 5/2017 | Rajopadhye et al. | |
| 2017/0119913 A1 | 5/2017 | Osterkamp et al. | |
| 2021/0352889 A1 | 11/2021 | Fefer | |
| 2022/0089615 A1 | 3/2022 | Fefer et al. | |
| 2022/0132855 A1 | 5/2022 | Fefer et al. | |
| 2022/0132856 A1 | 5/2022 | Fefer et al. | |

FOREIGN PATENT DOCUMENTS

| | | |
|---|---|---|
| CN | 105111219 | 12/2015 |
| CN | 105748439 | 7/2016 |
| CN | 107417706 | 7/2019 |
| EP | 0233701 | 8/1987 |
| EP | 0733066 | 9/1996 |
| EP | 1976861 | 10/2008 |
| EP | 2240767 | 10/2010 |
| EP | 2943072 | 11/2015 |
| EP | 2954933 | 12/2015 |
| EP | 2954934 | 12/2015 |
| EP | 3142684 | 3/2017 |
| EP | 3237487 | 11/2017 |
| NO | 151687 | 2/1985 |
| WO | WO 2005048944 | 6/2005 |
| WO | WO 2005123105 | 12/2005 |
| WO | WO 2009137062 | 11/2009 |
| WO | WO 2013073998 | 3/2013 |
| WO | WO 2013130510 | 9/2013 |
| WO | WO 2013192521 | 12/2013 |
| WO | WO 2015081441 | 6/2015 |
| WO | WO 2018135882 | 7/2018 |
| WO | WO 2019033216 | 2/2019 |
| WO | WO 2019210403 | 11/2019 |
| WO | WO 2020150831 | 7/2020 |
| WO | WO 2020163964 | 8/2020 |
| WO | WO 2020163965 | 8/2020 |

OTHER PUBLICATIONS

Agrilife.org [online], "Adjuvant", 2013, retrieved on May 27, 2022, retrieved from <URL: http://agrilife.org/fisheries2/files/2013/09/Adjuvants.pdf<, 3 pages.

Bhosale et al., "Supramolecular self-assembly of protoporphyrin IX amphiphiles into worm-like and particular aggregates," Supramolecular Chemistry, Mar. 1, 2011,;23(03-04):263-268.

Chembk.com [online], "C.I. Pigment Green 7," Mar. 28, 2022, retrieved on Aug. 4, 2022, retrieved from URL<https://www.chembk.com/en/chem/C.I.%20Pigment%20Green%207>, 7 pages.

Chen et al., "Chlorin e6 131: 152-Anhydride: A Key Intermediate in Conjugation Reactions of Chlorin e6," European journal of organic chemistry, Jun. 2015, 2015(17):3661-3665.

DeOliveira et al., "Chlorins: natural sources, synthetic developments and main applications," Current Organic Synthesis, Feb. 1, 2014, 11(1):42-58.

Guo et al., "Synergistic antiproliferative effect of chemo-phototherapy: Synthesis and photodynamic activity evaluation of novel Chlorin e6-artesunate conjugates as antiproliferative agents," Bioorganic & Medicinal Chemistry Letters, Oct. 1, 2017, 4 pages.

Jung et al., "Toxic tetrapyrrole accumulation in protoporphyrinogen IX oxidase-overexpressing transgenic rice plants," Plant molecular biology, Jul. 2008, 67(5):535-546.

Li et al., "Self-assembled chlorin e6 conjugated chondroitin sulfate nanodrug for photodynamic therapy," Biomacromolecules, May 9, 2011, 12(5):1724-1730.

Mojarrad et al., "A novel porphyrinic photosensitizer based on the molecular complex of meso-tetraphenylporphyrin with 2, 3-dichloro-5, 6-dicyano-1, 4-benzoquinone: higher photocatalytic activity, photooxidative stability and solubility in non-chlorinated solvents," RSC advances, 2016, 6(103):100931-100938.

PCT International Preliminary Report on Patentability in International Application No. PCT/CA2020/050083, dated Apr. 21, 2021, 5 pages.

PCT International Search Report and Written Opinion in International Application No. PCT/CA2020/050083, dated Apr. 22, 2020, 10 pages.

PCT International Search Report and Written Opinion in International Appln. No. PCT/CA2020/050219, dated Nov. 5, 2020, 8 pages.

Uchoa et al., "Relationship between structure and photoactivity of porphyrins derived from protoporphyrin IX," Journal of Porphyrins and Phthalocyanines, Sep. 2010, 14(09):832-845.

Yang et al., "Silica-hemin composite nanoparticles as new biocatalyst to highly sensitive determination of glucose in human serum," Analytical sciences, 2004, 20(9):1265-1270.

\* cited by examiner

Table 1.

| Tr No. | Treatment | 0 DAT | | 6 DAT | | 14 DAT | | 28 DAT | |
|---|---|---|---|---|---|---|---|---|---|
| | | Grass | Dandelion | Grass | Dandelion | Grass | Dandelion | Grass | Dandelion |
| 1 | untreated control | 0 | 0 | 0 | 0 | 1 | 0 | 0 | 0 |
| 2 | 1.5%IBA-K | 0 | 0 | 1 | 3 | 5 | 4 | 0 | 3 |
| 3 | 2%DTPA-Na5 | 0 | 0 | 1 | 3 | 1 | 4 | 0 | 4 |
| 4 | 1.5%IBA-K+2%DTPA-Na5 | 0 | 0 | 1 | 6 | 2 | 8.5 | 0 | 9 |
| 5 | 1.5%IBA-K+2%DTPA-Na5+2%Polyethylene glycol 200 | 0 | 0 | 2 | 8 | 4 | 9 | 3 | 10 |
| 6 | 0.5%IBA-K+2%DTPA-Na5+2%Polyethylene glycol 200 | 0 | 0 | 1 | 9 | 2.5 | 9 | 0 | 9 |
| 7 | 1.5%IBA-K+2%DTPA-Na5+5%Propylene glycol | 0 | 0 | 2 | 8 | 3 | 9 | 0 | 9.5 |
| 8 | 1.5%IBA-K+1.5%DTPA-Na5+2%Polyethylene glycol 200+0.2% paraffin oil+0.3%alcohol ethoxylate | 0 | 0 | 3 | 6.5 | 3 | 9 | 0 | 9.5 |
| 9 | 1.5%IBA-K+1%DTPA-Na5+5%Propylene glycol+0.4%paraffin oil+0.6%alcohol ethoxylate | 0 | 0 | 3 | 7.5 | 4 | 9 | 0 | 9 |
| 10 | 1.5%IBA-K+2%DTPA-Na5+0.4%paraffin oil+0.6%alcohol ethoxylate | 0 | 0 | 4 | 10 | 6 | 10 | 6 | 10 |
| 11 | 1.5%IAA-K+1.5%HEDTA-Na3+2%Polyethylene glycol 200 | 0 | 0 | 4 | 9 | 3 | 9 | 0 | 9.5 |
| 12 | 1.5%IBA-K+1.5%HEDTA-Na3 | 0 | 0 | 1 | 4 | 3 | 7 | 0 | 7 |
| 13 | 1.5%IBA-K+1.5%HEDTA-Na3+2%Polyethylene glycol 200 | 0 | 0 | 3 | 5 | 2.5 | 8.5 | 0 | 8.5 |
| 14 | 1.5%IBA-K+2.5%HEDTA-na3+0.4%paraffin oil+0.6%alcohol ethoxylate | 0 | 0 | 8 | 9 | 8 | 9.5 | 5 | 10 |

FIG. 1

Table 2.

| Tr No. | Treatment | 0 DAT Grass | 0 DAT Dandelion | 6 DAT Grass | 6 DAT Dandelion | 20 DAT Grass | 20 DAT Dandelion |
|---|---|---|---|---|---|---|---|
| 1 | Untreated Control | 0 | 0 | 4 | 0 | 4 | 0 |
| 2 | 1.5%iBA (dissolved in 1N KHCO3)+2.5%DTPA-Na5+5%Propylene glycol | 0 | 0 | 5 | 5 | 4 | 9 |
| 3 | 1.5%iBA (dissolved in 1N KHCO3)+2%EDTA-Na2+5%Propylene glycol | 0 | 0 | 6 | 6 | 4 | 10 |
| 4 | 1.5%iBA (dissolved in 1N KHCO3)+2%EDTA-Na2Ca+5%Propylene glycol | 0 | 0 | 4 | 7 | 2 | 10 |
| 5 | 1.5%iBA (dissolved in 1N KHCO3)+2%EDDS+5%Propylene glycol | 0 | 0 | 2 | 7 | 0 | 9 |
| 6 | 1.5%iBA (dissolved in 1N KHCO3)+2%EDTA-Na4+5%Propylene glycol | 0 | 0 | 4 | 5 | 2 | 9 |
| 7 | 1.5%iBA (dissolved in 1N KHCO3)+2.5%DTPA-Na5+5%Propylene glycol | 0 | 0 | 5 | 4 | 3 | 9 |
| 8 | 1.5%iBA (dissolved in 1N KHCO3)+2.5%DTPA-Na5+2%Polyethylene glycol 200 | 0 | 0 | 5 | 5 | 1 | 8 |
| 9 | 1.5%iBA (dissolved in 1N KHCO3)+2.5%DTPA-Na5+10%Propylene glycol | 0 | 0 | 7 | 5 | 4 | 9 |
| 10 | 1.5%iBA (dissolved in 1N KHCO3)+2.5%DTPA-Na5+0.25%sorbitan surfactant | 0 | 0 | 7 | 7 | 6 | 10 |
| 11 | 1.5%iBA (dissolved in 1N KHCO3)+2.5%DTPA-Na5+0.4%paraffin oil+0.6%alcohol ethoxylate | 0 | 0 | 8 | 8 | 7 | 10 |
| 12 | 1.5%iBA (dissolved in 1N KHCO3)+2.5%DTPA-Na5+0.08%paraffin oil+0.16%alcohol ethoxylate | 0 | 0 | 4 | 4 | 2 | 8 |
| 13 | 1.5%iBA (dissolved in 1N KHCO3)+2.5%DTPA-Na5+0.25%phosphate ester surfactant | 0 | 0 | 5 | 7 | 6 | 10 |
| 14 | 1.5%iBA (dissolved in 1N KHCO3)+2.5%DTPA-Na5+0.25% silicone surfactant | 0 | 0 | 6 | 8 | 8 | 10 |
| 15 | 1.5%iBA (dissolved in 1N KHCO3)+2.5%DTPA-na5+0.25%alcohol ethoxylate | 0 | 0 | 8 | 6 | 8 | 10 |

FIG. 2

Table 3.

| Tr. No. | Treatment | Plant Injury (0-10) | | | | | |
|---|---|---|---|---|---|---|---|
| | | 0 DAT | | 14 DAT | | 28 DAT | |
| | | Grass | Dandelion | Grass | Dandelion | Grass | Dandelion |
| 1 | Untreated control | 0 | 0 | 3 | 0 | 1 | 2 |
| 2 | 1.5%IBA-K | 0 | 0 | 0 | 2.5 | 1 | 0 |
| 3 | 5%IBA-K | 0 | 0 | 7 | 6.5 | 6 | 6 |
| 4 | 10%IBA-K | 0 | 0 | 7 | 8.5 | 8 | 10 |
| 5 | 2% EDTA-Na4 | 0 | 0 | 0 | 2.5 | 1 | 2 |
| 6 | 3% EDTA-Na4 | 0 | 0 | 1 | 5 | 2 | 6.5 |
| 7 | 5% EDTA-Na4 | 0 | 0 | 1 | 7.5(regrowth) | 0 | 4(regrowth) |
| 8 | 10% EDTA-Na4 | 0 | 0 | 3 | 9.5(regrowth) | 0 | 4(regrowth) |
| 9 | 2% EDTA-Na4 + 1.5%IBA-K | 0 | 0 | 5.5 | 8 | 5 | 10 |
| 10 | 2% EDTA-Na4 + 1.5%IBA | 0 | 0 | 5.5 | 9.5 | 4 | 10 |
| 11 | 3% EDTA-Na4 + 1.5%IBA-K | 0 | 0 | 2.5 | 9 | 2 | 9.5 |
| 12 | 3% EDTA-Na4 + 1.5%IBA | 0 | 0 | 2.5 | 8 | 1 | 10 |
| 13 | 5% EDTA-Na4 + 1.5%IBA-K | 0 | 0 | 4.5 | 7 | 4 | 10 |
| 14 | 5% EDTA-Na4 + 1.5%IBA | 0 | 0 | 3 | 7.5 | 2 | 9 |
| 15 | 2% EDTA-Na2 | 0 | 0 | 0 | 3 | 0 | 1 |
| 16 | 3% EDTA-Na2 | 0 | 0 | 0 | 6 | 2 | 6 |
| 17 | 5% EDTA-Na2 | 0 | 0 | 2 | 5.5(regrowth) | 1 | 2(regrowth) |
| 18 | 10% EDTA-Na2 | 0 | 0 | 0 | 7.5(regrowth) | 2 | 2(regrowth) |
| 19 | 2% EDTA-Na2 + 1.5%IBA-K | 0 | 0 | 2 | 7.5 | 1 | 6.5 |
| 20 | 3% EDTA-Na2 + 1.5%IBA-K | 0 | 0 | 3 | 8 | 3 | 9.5 |
| 21 | 3% EDTA-CaNa2 | 0 | 0 | 0 | 2 | 1 | 1 |
| 22 | 5% EDTA-CaNa2 | 0 | 0 | 1 | 5 | 1 | 7(regrowth) |
| 23 | 10% EDTA-CaNa2 | 0 | 0 | 3 | 7.5 | 1 | 9(regrowth) |
| 24 | 3% EDTA-CaNa2 + 1.5%IBA-K | 0 | 0 | 1 | 5 | 2 | 9 |

FIG. 3

Table 4.

| Tr No. | Treatment | Common dandelion %Control | Henbit %Control | Black medic %Control | Sticky chickweed %Control | Carolina geranium %Control | Dichondra %Control |
|---|---|---|---|---|---|---|---|
| 1 | Untreated Control | 0 | 0 | 0 | 0 | 0 | 0 |
| 2 | 1.5%IBA +2%DTPA-Na5+5%Propylene glycol | 80 | 100 | 100 | 85 | 100 | 97.5 |
| 3 | 1%IBA+2%DTPA-Na5+5%Propylene glycol | 62.5 | 82.5 | 100 | 66.3 | 100 | 91.3 |
| 4 | 0.5%IBA+2%DTPA-Na5+5%Propylene glycol | 53.8 | 93.8 | 100 | 53.8 | 100 | 57.5 |
| 5 | 1%IBA-K+1.2%HEDTA_Na5+5%Propylene glycol | 85 | 95 | 100 | 78.8 | 91.3 | 90 |
| 6 | 1%IBA-K+2%EDTA-CaNa2+5%Propylene glycol | 53.8 | 87.5 | 100 | 46.3 | 93.8 | 95 |
| 7 | 1%IBA-K+2%EDTA-Na2+5%Propylene glycol | 75 | 97.5 | 100 | 60 | 100 | 100 |
| 8 | 1%IBA-K+2%EDTA-Na4+5%Propylene glycol | 77.5 | 100 | 95 | 82.5 | 97.5 | 87.5 |
| 9 | 1%IBA+1.2%DTPA-Na5+0.6% alcohol ethoxylate+0.4%paraffin oil+5%Propylene glycol | 65 | 100 | 100 | 91.3 | 98.8 | 60 |
| 10 | 1%IBA-K+1.5%EDTA-CaNa2+0.6%alcohol ethoxylate1+5%Propylene glycol | 61.3 | 86.3 | 100 | 70 | 44.3 | 75 |
| 11 | 1%IBA+2%DTPA+0.3%alcohol ethoxylate+0.2%paraffin oil | 70 | 100 | 100 | 85 | 96.3 | 71.3 |
| 12 | 1%IBA+2%EDTA-Na4+0.3%alcohol ethoxylate+0.2%paraffin oil | 65 | 97.5 | 100 | 73.8 | 95 | 66.3 |
| 13 | 1.5%IAA+2%DTPA+5%Propylene glycol | 75 | 100 | 95 | 82.5 | 97.5 | 91.3 |
| 14 | 1%IAA+2%DTPA+5%Propylene glycol | 88.8 | 95 | 68.8 | 80 | 93.8 | 93.8 |
| 15 | 1%IAA+2%EDTA-CaNa2+5%Propylene glycol | 68.8 | 87.5 | 87.5 | 71.3 | 92.5 | 100 |
| 16 | 1%IAA-K+1.5%EDTA-CaNa2+0.6%alcohol ethoxylate+0.4%paraffin oil+5%Propylene glycol | 80 | 100 | 100 | 100 | 93.8 | 68.8 |
| 17 | 1%IAA+2%EDTA-Na4+0.3%alcohol ethoxylate+0.2%paraffin oil | 53.8 | 100 | 95 | 73.8 | 92.5 | 87.5 |

FIG. 4

Table 5.

| Tr No. | Treatment | % control | | | | | | |
|---|---|---|---|---|---|---|---|---|
| | | 6 DAT | 11 DAT | 18 DAT | 25 DAT | 39 DAT | 56 DAT |
| 1 | Untreated Control | 0 | 0 | 0 | 0 | 0 | 0 |
| 2 | 2%DTPA-Na5+2%Polyethylene glycol | 38 | 50 | 53 | 67 | 47 | 49 |
| 3 | 1.5%IBA-K+2%DTPA-Na5+2%Polyethylene glycol | 66 | 47 | 47 | 83 | 71 | 91 |
| 4 | 1%IBA-K+2%DTPA-Na5+2%Polyethylene glycol | 38 | 70 | 72 | 78 | 58 | 79 |
| 5 | 1.5%IBA-K+1.6%DTPA-Na5+0.2%alcohol ethoxylates+0.3%paraffin oil+2%Polyethylene glycol | 21 | 38 | 42 | 64 | 58 | 63 |

FIG. 5

Table 6

| Treatment | 10DAT | | 30DAT | |
|---|---|---|---|---|
| | Weed Control% | Grass Injury | Weed Control% | Grass Injury |
| Untreated Control | 0% | | 0% | |
| 1.5%IBA-K | 29% | 0 | 43% | 0 |
| 2%DTPA-Na5 | 86% | 2 | 71% | 1 |
| 1.5%IBA-K+2%DTPA-Na5 | 90% | 2 | 90% | 0 |
| 1.5%IBA-K+2%DTPA-Na5+2%Polyethylene glycol | 86% | 5 | 93% | 3 |
| 1.5%IBA-K+2%DTPA-Na5+10%Propylene glycol | 86% | 5 | 93% | 2 |
| 1.5%IBA-K+2%DTPA-Na5+10%polyacrylic acid | 79% | 2 | 86% | 2 |
| 1.5%IBA-K+2%EDTA-Na4 | 70% | 2 | 90% | 1 |
| 1.5%IBA-K+3.5%EDDS-Na3 | 67% | 3 | 92% | 0 |
| 1.5%IBA-K+2.5%HEDTA-Na5 | 92% | 1 | 92% | 1 |
| 1.5%IBA-K+5%EDTA-(NH4)4 | 90% | 2 | 90% | 1 |
| 1.5%IBA-K+5%Na-lignosulfonic acid | 17% | 1 | 50% | 1 |

FIG. 6

Table 18.

| Formulation | 7 DAT | 14 DAT | 21 DAT | 28 DAT | |
|---|---|---|---|---|---|
| | Dandelion | Dandelion | Dandelion | Dandelion | Root exam |
| A: untreated control | 0 | 0 | 0 | 0 | healthy roots |
| B: 10% EDTA-Na4+3% alcohol ethoxylate | 8 | 9 | 8 (*new shoots emerge) | 4 (**plant fully grow back) | healthy roots |
| C: 0.2% IBA-K+10% EDTA-Na4 + 3% alcohol ethoxylate | 8 | 9 | 10 | 10 | no roots left, plant completely dead |
| D: 10% DTPA-Na5+2% paraffin oil+3% alcohol ethoxylate | 9 | 8 (*new shoots emerge) | 7 (*new shoots emerge) | 4 (**plant fully grow back) | healthy roots |
| E: 0.2% IBA-K+10% DTPA-Na5+2% paraffin oil+3% alcohol ethoxylate | 9 | 9 | 10 | 10 | roots significantly injured |

FIG. 7

NATURAL INDOLE AUXIN AND AMINOPOLYCARBOXYLIC ACID HERBICIDAL COMPOSITIONS

CROSS-REFERENCE TO RELATED APPLICATIONS

This application is a Continuation of U.S. application Ser. No. 14/376,006, filed on Jul. 31, 2014, which is a U.S. National Phase Application of International Patent Application No. PCT/CA2014/050259, filed Mar. 14, 2014, which claims the benefit of U.S. Provisional Application Ser. No. 61/793,914, filed Mar. 15, 2013, the contents of which are incorporated herein by reference in their entirety.

TECHNICAL FIELD

This disclosure features herbicidal compositions and methods of making and using the same.

BACKGROUND

Auxins are plant hormones that regulate plant growth and life cycle and constitute a class of plant growth substances that is often associated with the promotion of adventitious root formation. Indole-3-acetic acid (IAA), indole-3-butyric acid (IBA), and indole-3-propionic acid (IPA) are examples of indole alkanoic acid auxins. Both IAA and IBA are known to occur naturally plants (see, e.g., Ludwig-Mueller, J., Plant Growth Regulation 32: 219-230 (2000)). IBA is used commercially to promote root growth in plant clippings, and to promote development of flowers and fruit in plants. Another naturally occurring auxin, 2-phenylacetic acid (PAA), is an example of a phenyl alkanoic acid. Synthetic derivatives of PAA, e.g., phenoxy herbicides such as 2,4-dichlorophenoxyacetic acid ("2,4-D"), are used as herbicides. However, the use of 2,4-D has been prohibited in some jurisdictions due to concerns about its toxicity.

SUMMARY

Indole auxins (including, for example, indole-3-butyric acid (IBA)) are endogenous plant hormones that have been used to promote and accelerate root formation in plant clippings and to reduce transplant shock. Use of IBA as a growth regulator, for example, generally involves applications of low concentrations of IBA, for example, concentrations in the ppm range or <1% by weight IBA (see, e.g., Aini et al., *African Journal of Biotechnology* 8(22): 6158-6161 (2009)). Preparation of aqueous solutions of IBA at concentrations greater than about 1% by weight of IBA have been difficult due to the low water solubility of the compound. It has been surprisingly discovered that indole auxins can function as herbicides when used at high concentrations (e.g., greater than 5% by weight) or when used in combination with one or more chelators and/or adjuvants.

Exemplary formulations of such herbicidal compositions can include:

(1) one or more indole auxins, or an agriculturally suitable salt thereof; and (2) one or more chelating agents or an agriculturally suitable salt thereof.

In some embodiments, these compositions can be used as selective herbicides. For example, these formulations can be used to control (e.g., reduce the population of, effectively eradicate) the grown of unwanted vegetation while limiting negative effects (e.g., phytotoxicity) of any desired vegetation present (e.g., a turf grass).

Such formulations can be used in methods for controlling (e.g., reducing the population of, effectively eradicating) unwanted vegetation (e.g., a weed, including a broadleaf weed, for example, a broadleaf weed that typically occurs in the presence of desired vegetation (e.g., a turf grass), such as a dandelion).

Indole auxins can include, for example, indole-3-acetic acid or an agriculturally suitable salt thereof, indole-3-butyric acid or an agriculturally suitable salt thereof, and indole-3-propanoic acid or an agriculturally suitable salt thereof.

The methods can include applying, in combination:

(1) one or more indole auxins, or an agriculturally suitable salt thereof; and (2) one or more chelating agents or an agriculturally suitable salt thereof; to the unwanted vegetation and/or to a growing medium that is in proximity to a base and root system of the unwanted vegetation.

Also provided herein are concentrated formulations of one or more indole auxins such as indole-3-butyric acid (IBA), or an agriculturally suitable salt form thereof, at concentrations having at least about 5% by weight of one or more indole auxins. Such formulations have been found to be useful as nonselective herbicides. The herbicidal compositions of indole auxin can be used, for example, to control (e.g., reduce the population of, effectively eradicate) the growth of unwanted vegetation. In the case of a nonselective herbicide, the growth of plants (e.g., grass and weeds) contacted with the formulation can be controlled.

Herbicidal compositions of one or more indole auxin, or an agriculturally suitable salt thereof (1), can also be formulated with one or more agriculturally suitable adjuvants (3).

Provided herein are herbicidal compositions comprising:

(1) one or more indole, or an agriculturally suitable salt thereof; and (3) one or more agriculturally acceptable adjuvants. In some embodiments, these compositions can be used as selective or nonselective herbicides.

Such formulations can be used in methods for controlling (e.g., reducing the population of, effectively eradicating) unwanted vegetation (e.g., a weed, including a broadleaf weed, for example, a broadleaf weed that typically occurs in the presence of desired vegetation (e.g., a turf grass), such as a dandelion).

Indole auxins can include, for example, indole-3-acetic acid or an agriculturally suitable salt thereof, indole-3-butyric acid or an agriculturally suitable salt thereof, and indole-3-propanoic acid or an agriculturally suitable salt thereof.

The methods can include applying, in combination:

(1) one or more indole auxins, or an agriculturally suitable salt thereof; and (3) one or more agriculturally acceptable adjuvants;

to the unwanted vegetation and/or to a growing medium that is in proximity to a base and root system of the unwanted vegetation.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 1 provides Table 1 and details the results of various formulations and herbicidal compositions on the control of dandelions.

FIG. 2 provides Table 2 and details the results of various formulations and herbicidal compositions on the control of dandelions.

FIG. 3 provides Table 3 and details the results of various formulations of indole-3-butyric acid (IBA) and/or ethylenediaminetetraacetic acid (EDTA) on the control of dandelions.

FIG. 4 provides Table 4 and details the results of various formulations of indole auxins and chelators in a field test to determine the effect of these formulations on the control of common lawn weeds in Florida.

FIG. 5 provides Table 5 and details the results of various formulations of indole-3-butyric acid (IBA) and/or diethylenetriaminepentaacetic acid (DTPA) in a field test to determine the effect of these formulations on the control of buckthorn plantains in North Carolina.

FIG. 6 provides Table 6 and details the results of various formulations of indole-3-butyric acid (IBA) and/or various chelating agents in a field test to determine the effect of these formulations on the control of dandelions in Ontario.

FIG. 7 provides Table 18 and details the results of various formulations of a chelator and/or indole-3-butyric acid (IBA) on the effect of the formulations on the roots of dandelions.

DETAILED DESCRIPTION

Indole alkanoic acids (i.e. indole auxins) such as IAA and IBA have been widely used to promote growth and development of roots, flowers and fruits, and to increase crop yields. Both IAA and IBA occur naturally in plants and generally do not pose any known risks to humans or the environment. Although indole auxins such as IAA and IBA are known to have limited solubility in water, the inventors have discovered that these compounds can be effective as herbicides. For example, combinations of one or more indole auxins and one or more chelators have been found to act as selective herbicides that are effective at controlling weeds (e.g., broadleaf weeds) while having little to no effect on desired vegetation (e.g., turfgrass). In addition, it has been found that indole auxins can be effective in controlling unwanted vegetation (e.g., both weeds and unwanted grasses) at higher concentrations (e.g., greater than about 5%) than in normal root promoting dosages when applied in water solutions (e.g., solutions with a pH greater than about 6.0, e.g., 7.0 to 9.0).

Definitions

For the terms "for example" and "such as," and grammatical equivalences thereof, the phrase "and without limitation" is understood to follow unless explicitly stated otherwise. As used herein, the singular forms "a," "an," and "the" include plural referents unless the context clearly dictates otherwise.

As used herein, the term "unwanted vegetation" includes vegetation that is undesirable from an aesthetic perspective and/or that could detrimentally affect the health of proximal desired vegetation (e.g., in a residential and/or commercial setting). In certain embodiments, "unwanted vegetation" includes weeds and unwanted plants, including dicotyledonous plants, monocotyledonous plants, conifers, cycads, ferns, horsetails, mosses, liverworts, and algae; e.g., common weeds such as dandelions (*Taraxacum officinale*), daisies (*Bellis perennis*), chickweed (*Stellaria media*), plantains, clovers, thistles, black medic. In certain embodiments, the methods described herein can further include identifying and/or selecting a site in need of controlling unwanted vegetation.

As used herein, the term "nonselective herbicide" refers to broad spectrum herbicide that is formulated to control the growth of broadleaf weeds and grasses.

As used herein, the term "selective herbicide" refers to an herbicide that is formulated to be selectively toxic to some plant species but relatively benign to others. For example, a selective herbicide may be selectively toxic to broadleaf weeds but less toxic to grasses (e.g., turf grasses).

As used herein, the term "synthetic herbicide" refers to an herbicide that is not found naturally (e.g., not found naturally in plants). For example, synthetic herbicides can include 2,4-D, clopyralid, dicamba, fluroxypyr, and picloram.

As used herein, the term "turf grass" refers to a cultivated grass that provides groundcover, for example a turf or lawn that is periodically cut or mowed to maintain a consistent height. Grasses belong to the Poaceae family, which is subdivided into six subfamilies, three of which include common turf grasses: the Festucoideae subfamily of cool-season turf grasses; and the Panicoideae and Eragrostoideae subfamiles of warm-season turf grasses. A limited number of species are in widespread use as turf grasses, generally meeting the criteria of forming uniform soil coverage and tolerating mowing and traffic. In general, turf grasses have a compressed crown that facilitates mowing without cutting off the growing point. In the present context, the term "turf grass" includes areas in which one or more grass species are cultivated to form relatively uniform soil coverage, including blends that are a combination of differing cultivars of the same species, or mixtures that are a combination of differing species and/or cultivars.

Examples of turf grasses include, without limitation:

bluegrasses (*Poa* spp.), such as kentucky bluegrass (*Poa pratensis*), rough bluegrass (*Poa trivialis*), Canada bluegrass (*Poa compressa*), annual bluegrass (*Poa annua*), upland bluegrass (*Poa glaucantha*), wood bluegrass (*Poa nemoralis*), bulbous bluegrass (*Poa bulbosa*), Big Bluegrass (*Poa ampla*), Canby Bluegrass (*Poa canbyi*), Pine Bluegrass (*Poa scabrella*), Rough Bluegrass (*Poa trivialis*), Sandberg Bluegrass (*Poa secunda*);

the bentgrasses and Redtop (*Agrostis* spp.), such as creeping bentgrass (*Agrostis palustris*), colonial bentgrass (*Agrostis capillaris*), velvet bentgrass (*Agrostis canina*), South German Mixed Bentgrass (*Agrostis* spp. including *Agrostis tenius, Agrostis canina*, and *Agrostis palustris*), Redtop (*Agrostis alba*), Spike Bentgrass (*Agrostis exerata*);

the fescues (*Festucu* spp.), such as red fescue (*Festuca rubra* spp. *rubra*) creeping fescue (*Festuca rubra*), chewings fescue (*Festuca rubra commutata*), sheep fescue (*Festuca ovina* var. *ovina*), hard fescue (*Festuca longifolia*), hair fescue (*Festucu capillata*), tall fescue (*Festuca arundinacea*), meadow fescue (*Festuca elatior*), Arizona Fescue (*Festuca arizonica*), Foxtail Fescue (*Festuca megalura*), Idaho Fescue (*Festuca idahoensis*), Molate Fescue (*Fescue rubra*);

the ryegrasses (*Lolium* spp.), such as annual ryegrass (*Lolium multiflorum*), perennial ryegrass (*Lolium perenne*), and italian ryegrass (*Lolium multiflorum*);

the wheatgrasses (*Agropyron* spp.), such as crested wheatgrass (*Agropyron cristatum*), desert wheatgrass (*Agropyron desertorum*), western wheatgrass (*Agropyron smithii*), Intermediate Wheatgrass (*Agropyron intermedium*), Pubescent Wheatgrass (*Agropyron trichophorum*), Slender Wheatgrass (*Agropyron trachycaulum*), Streambank Wheatgrass (*Agropyron riparium*), Tall Wheatgrass (*Agropyron elongatum*), and Bluebunch Wheatgrass (*Agropyron spicatum*);

beachgrass (*Ammophila breviligulata*);

Brome grasses (*Bromus* spp.), such as Arizona Brome (*Bromus arizonicus*), California Brome (*Bromus carinatus*), Meadow Brome (*Bromus biebersteinii*), Mountain Brome (*Bromus marginatus*), Red Brome (*Bromus rubens*), and smooth bromegrass (*Bromus inermis*);

cattails such as Timothy (*Phleum pratense*), and sand cattail (*Phleum subulatum*); orchardgrass (*Dactylis glomerata*);

Alkaligrass (*Puccinellia distans*);

crested dog's-tail (*Cynosurus cristatus*);

Bermudagrass (*Cynodon* spp. such as *Cynodon dactylon*); hybrid bermudagrass such as tifdwarf bermudagrass, ultradwarf bermudagrass, tifgreen bermudagrass, tifsport bermudagrass, GN-1 bermudagrass, Ormond bermudagrass, and tifway bermudagrass;

Zoysiagrasses (*Zoysia* spp.) such as *Zoysia japonica, Zoysia matrella,* and *Zoysia tenuifolia;*

St. Augustinegrass (*Stenotaphrum secundatum*) such as Bitter Blue St. Augustinegrass, Seville St. Augustinegrass, Floratam St. Augustinegrass, Floralawn St. Augustinegrass, Floratine St. Augustinegrass, Raleigh St. Augustinegrass, and Texas Common St. Augustinegrass;

Centipedegrass (*Eremochloa ophiuroides*);

Carpetgrass (*Axonopus fissifolius*);

Bahiagrass (*Paspalum notatum*);

Kikuyugrass (*Pennisetum clandestinum*);

Buffalograss (*Buchloe dactyloids*);

Seashore paspalum (*Paspalum vaginatum*); Blue Grama (*Bouteloua gracilis*); Black Grama (*Bouteloua eriopoda*); Sideoats Grama (*Bouteloua curtipendula*);

*Sporobolus* spp., such as Alkali Sacaton (*Sporobolus airiodes*);

Sand Dropseed (*Sporobolus cryptandrus*), and Prairie Dropseed (*Sporobolus heterolepis*);

*Hordeum* spp., such as California Barley (*Hordeum californicum*),

Common Barley (*Hordeum vulgare*), and Meadow Barley (*Hordeum brachyantherum*);

*Alopecurus* spp., such as Creeping Foxtail (*Alopecurus arundinaceaus*), and Meadow Foxtail (*Alopecurus pratensis*);

*Stipa* spp., such as Needle & Thread (*Stipa comata*), Foothill Needlegrass (*Stipa lepida*), Green Needlegrass (*Stipa viridula*), Nodding Needlegrass (*Stipa cernua*), and Purple Needlegrass (*Stipa pulchra*);

*Elymus* spp., such as Blue Wildrye (*Elymus glaucus*), Canada Wildrye (*Elymus Canadensis*), Creeping Wildrye (*Elymus triticoides*), and Russian Wildrye (*Elymus junceus*);

Buffelgrass (*Cenchrus ciliaris*);

Big Quaking Grass (*Briza maxima*);

Big Bluestem (*Andropogon gerardii*),

Little Bluestem (*Schizachyruim scoparium,* and Sand Bluestem (*Andropogon hallii*);

Deergrass (*Muhlenbergia rigens*);

Eastern Gamagrass (*Tripsacum dactyloides*);

Galleta (*Hilaria jamesii*);

Tufted Hairgrass (*Deschampsia caespitosa*);

Indian Rice Grass (*Oryzopsis hymenoides*);

Indian Grass (*Sorghastrum nutans*);

Sand Lovegrass (*Eragrostis trichodes*); Weeping Lovegrass (*Eragrostis curvula*);

California Melic (*Melica californica*);

Prairie Junegrass (*Koeleria pyramidata*);

Prairie Sandreed (*Calamovilfa longifolia*);

Redtop (*Agrostis alba*);

Reed Canarygrass (*Phalaris arundinacea*);

Sloughgrass (*Spartina pectinata*);

Green Sprangletop (*Leptochloa dubia*);

Bottlebush Squirreltail (*Sitanion hystrix*);

Panicum Switchgrass (*virgatum*); and

Purple Threeawn (*Aristida purpurea*).

As used herein, the term "crop plant" refers to a non-woody plant, which is grown, tended to, and harvested in a cycle of one year or less as a source of foodstuffs and/or energy. Examples of crop plants include, without limitation, sugar cane, wheat, rice, corn (maize), potatoes, sugar beets, barley, sweet potatoes, cassava, soybeans, tomatoes, and legumes (beans and peas).

As used herein, the term "tree" refers to a woody perennial plant having a single stem or trunk and bearing lateral branches at some distance from the ground. In certain embodiments, the tree is deciduous. In other embodiments, the tree is evergreen (e.g., coniferous). In still other embodiments, the tree is deciduous or evergreen and is grown, tended to, and harvested in a cycle of one year or less as a source of foodstuffs. Examples of trees include, without limitation, maple trees, citrus trees, apple trees, pear trees, an oak tree, an ash tree, a pine tree, and a spruce tree.

In a further embodiment, the plant is a shrub.

As used herein, the term "consisting essentially of" signals the exclusion of certain un-recited components from the methods and compositions (e.g., herbicidal compositions) described herein, which might otherwise be included using the open-ended transitional phrase "comprising." In some embodiments, the phrase "consisting essentially of" signals the exclusion of the following moieties delineated in one or more of (A), (B), (C), and (D) below from the methods and compositions (e.g., herbicidal compositions) described herein.

(A) Any one or more chelating agents having one or more (e.g., two) chelated, complexed, or sequestered transition metal ions (e.g., those in which the metal ion(s) is/are a transition metal ion, e.g., those in which the transition metal ion is an iron ion, such as $Fe^{+2}$ ions, $Fe^{+3}$ ions, and mixtures thereof). In certain embodiments, chelating agents with transition metals exhibit herbicidal activity. Examples include those disclosed in, e.g., U.S. Pat. No. 8,076,267; WO 2012/055991; U.S. Pat. Nos. 6,323,153; and 6,972,273, each of which is incorporated by reference in its entirety (e.g., for purposes of this exclusion).

(B) Any one or more herbicides (e.g., any one or more nonselective herbicides and/or any one or more selective herbicides) applied in combination with one or more plant growth regulators). In some embodiments, the one or more herbicides are synthetic herbicides. Examples of herbicides can include those disclosed in, e.g., U.S. Pat. No. 8,076,267; WO 2011/028987; WO 2012/055991; US 2004/0151749; U.S. Pat. Nos. 5,668,086; and 6,972,273, each of which is incorporated by reference in its entirety (e.g., for purposes of this exclusion). More particularly, examples can include:

phenoxyacetic acid, phenoxyalkanoic acid, benzoic acid, and mixtures thereof;

glyphosate, glufosinate, fatty acids and salts thereof, urea, sodium, borax, copper sulfate, carboxylic acids and the salts thereof, ammonium salts, and combinations thereof;

aminopyralid (4-amino-3,6-dichloropyridine-2-carboxylic acid), clomeprop ((RS)-2-(2,4-dichloro-m-tolyloxy)propionanilide), clopyralid (3,6-dichloro-2-pyridinecarboxylic acid), 2,4-D ((2,4-dichlorophenoxy) acetic acid), dicamba (3,6-dichloro-2-methoxybenzoic acid), dichlorprop ((.+-.)-2-(2,4-dichlorophenoxy)propanoic acid), fluroxypyr ([(4-amino-3,5-dichloro-6-fluoro-2-pyridinyl)oxy]acetic acid), MCPA ((4-chloro-2-methylphenoxy)acetic acid), mecoprop ((.+-.)-2-(4-chloro-2-methylphenoxy)propanoic acid), picloram (4-amino-3,5,6-trichloro-2-pyridinecarboxylic acid), quinclorac (3,7-dichloro-8-quinolinecarboxylic acid), quinmerac (7-chloro-3-methyl-8-quinolinecarboxylic acid), triclopyr ([(3,5,6-trichloro-2-pyridinyl)oxy]acetic acid), their salts, acids, esters, and combinations thereof;

acid amide hebicides such as Propanil (DCPA)[3',4'-dichloropropionanilide] and Alachlor[2-chloro-2',6'-diethyl-N-(methoxyethyl)acetanilide]; urea herbicides such as Diuron (DCMU)[3-(3,4-dichlorophenyl)-1,1-dimethylurea] and Linuron[3-(3,4-dichlorophenyl)-1-methoxy-1-methylurea]; dipyridyl herbicides such as Paraquat Dichloride (Paraquat)[1,1'-dimethyl-4,4'-bipy-ridirium dichloride] and Diquat Dibromide (Diquat)[6,7-dihydrodipyrido[1,2-a:2',1'-c]-pyrazindiium dibromide]; diazine herbicides such as Bromacil[5-bromo-3-sec-butyl-6-methyluracil]; S-triazine herbicides such as Simazine[2-chloro-4,6-bis(ethyl-amino)-1,3,5-triazine] and Simetryn[2,4-bis(ethyl-amino)-6-methylthio-1,3,5-triazine]; nitrile herbicides such as Dichlobeni (DBN)[2,6-dichloro-benzonitrile]; dinitroaniline herbicides such as Trifluralin[.alpha.,.alpha.,.alpha.-tri-fluoro-2,6-dinitro-N,N-dipropyl-p-toluidine]; carbamate herbicides such as Benthiocarb[S-p-chlorobenzyl diethylthiocarbamate] and MCC[methyl 3,4-dichlorocarbanilate]; diphenylether herbicides such as Nitrofen (NIP)[2,4-dichlorophenyl-p-nitrophenylether]; phenol herbicides such as PCP[pentachlorophenol]; benzoic acid herbicides such as Dicamba (MDBA)[3,6-dichloro-2-methoxybenzoic acid dimethylamine salt]; phenoxy herbicides such as 2,4-D[2,4-dichlorophenoxyacetic acid and salts (sodium, amine and ethylether) thereof], and Mapica (MCPCA)[2'-chloro-2-(4-chloro-o-tolyloxy)acetanilide]; organic phosphorus herbicides such as Glyphosate[N-(phosphonomethyl)glycine] and salts thereof, Bialaphos[sodium salt of L-2-amino-4-[(hydroxy)(methyl)-phosphin-oyl]butyryl-L-alanyl-L-alanine) and Glufosinate[ammonium DL-homoalanin-4-yl (methyl)-phosphinate], and aliphatic herbicides such as TCA[trichloroacetic acid and salts thereof].

(C) EDDHA, EDDHMA, and HBED.

(D) Fungicides, insecticides, and miticides disclosed in US 2004/0151749.

As used herein, the term "consisting of" signals the exclusion of components other than those following the recitation of "consisting of" from the methods and compositions (e.g., herbicidal compositions) described herein.

Each occurrence of "substantially free" when used in conjunction with a particular moiety is, independently, defined to mean that the combination, composition, or method does not include a detectable amount of the moiety.

Components

[1] Indole Auxins

The methods and compositions (e.g., herbicidal compositions) provided herein include one or more indole auxins, or an agriculturally suitable salt thereof. Indole auxins are members of a broader class of plant hormones having morphogen-like characteristics. An indole auxin is a compound comprising an indole core structure and a carboxylic acid group, or a salt form thereof. For example, the indole ring can be substituted in the 3-position with an alkyl carboxylic acid (—$(CH_2)_x$COOH, wherein x is an integer from 1 to 10, or a salt form thereof. Further substitutions, for example, substitutions on the indole ring structure are permitted as long as the compound retains its herbicidal activity and does not pose any known risks to humans or the environment.

As used herein, indole-3-acetic acid ("IAA") refers to a compound having the following chemical structure:

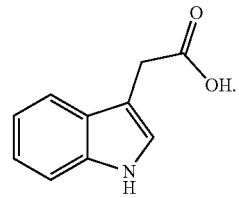 [SMILES: O=C(O)Cc1c[nH]c2ccccc12]

As used herein, indole-3-butyric acid ("IBA") refers to a compound having the following chemical structure:

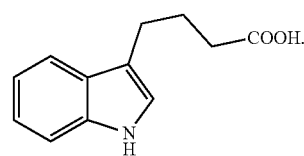 [SMILES: O=C(O)CCCc1c[nH]c2ccccc12]

As used herein, indole-3-propanoic acid ("IPA") refers to a compound having the following chemical structure:

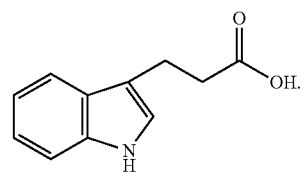 [SMILES: O=C(O)CCc1c[nH]c2ccccc12]

In general, an indole auxin can be applied as the free acid or as a salt. When more than one indole auxin is present, each indole auxin can be, independently, applied as either the free acid or as a salt.

In certain embodiments, the indole auxin can be applied as the free acid.

In certain embodiments, the indole auxin can be applied as a salt. Exemplary salts include potassium salts, sodium salts, ammonium salts, isopropylamine salts, dimethylamine salts, triethylamine salts, diglycolamine salts, triisopropanolamine salts, triisopropanolammonium salts, monoethanolamine salts, diethanolamine salts, and combinations thereof.

In some embodiments, each of the one or more indole auxins is substantially free of the plant and/or plant material in which it is known to be present or from which it has been isolated. In some embodiments, one or more of the indole auxins can be prepared using known synthetic methods.

[2] Chelating Agents

The term "chelating agent" is a term of art and refers generally to a moiety that can form several bonds to a single metal ion and is sometimes described as being a multidentate ligand.

In some embodiments, each of the one or more chelating agents is independently selected from the group consisting of: an aminopolycarboxylic acid, an aromatic or aliphatic carboxylic acid, an amino acid, a phosphonic acid, and a hydroxycarboxylic acid or a salt thereof.

In certain embodiments, the methods and compositions (e.g., herbicidal compositions) described herein include one or more aminopolycarboxylic acid chelating agents. Examples of aminopolycarboxylic acid chelating agents include, without limitation, ethylenediaminetetraacetic acid (EDTA), diethylenetriaminepentaacetic acid (DTPA), hydroxyethylenediaminetriacetic acid (HEDTA), and ethylenediaminedisuccinate (EDDS), cyclohexanediaminetetraacetic acid (CDTA), N-(2-hydroxyethyl)ethylenediaminetriacetic acid (EDTA-OH) glycol ether diaminetetraacetic acid (GEDTA), alanine diacetic acid (ADA), alkoyl ethylene diamine triacetic acids (e.g., lauroyl ethylene diamine triacetic acids (LED3A)), asparticaciddiacetic acid (ASDA), asparticacidmonoacetic acid, diamino cyclohexane tetraacetic acid (CDTA), 1,2-diaminopropanetetraacetic acid (DPTA-OH), 1,3-diamino-2-propanoltetraacetic acid (DTPA), diethylene triamine pentamethylene phosphonic acid (DTPMP), diglycolic acid, dipicolinic acid (DPA), ethanolaminediacetic acid, ethanoldiglycine (EDG), ethylenediaminediglutaric acid (EDDG), ethylenediaminedi (hydroxyphenylacetic acid (EDDHA), ethylenediaminedipropionic acid (EDDP), ethylenediaminedisuccinate (EDDS), ethylenediaminemonosuccinic acid (EDMS), ethylenediaminetetraacetic acid (EDTA), ethylenediaminetetrapropionic acid (EDTP), and ethyleneglycolaminoethylestertetraacetic acid (EGTA) and salts (for example, the sodium salts and potassium salts) thereof.

For example, the methods and compositions (e.g., herbicidal compositions) described herein can include one or more of the following aminopolycarboxylic acid chelating agents: ethylenediaminetetraacetic acid (EDTA), diethylentriaminepentaacetic acid (DTPA), hydroxyethylenediaminetriacetic acid (HEDTA), and ethylenediaminedisuccinate (EDDS) or a salt thereof.

In some embodiments, the methods and compositions (e.g., herbicidal compositions) described herein include ethylenediaminetetraacetic acid (EDTA) or a salt thereof as the chelating agent.

In certain embodiments, the methods and compositions (e.g., herbicidal compositions) described herein include one or more amino acid chelating agents. Examples of amino acid chelating agents include, without limitation, alanine, arginine, asparagine, aspartic acid, glutamic acid, glutamine, glycine, histidine, isoleucine, leucine, lysine, methionine, proline, serine, threonine, tyrosine, valine, and salts (for example, the sodium salts and potassium salts) and combinations thereof.

In some embodiments, the methods and compositions (e.g., herbicidal compositions) described herein include one or more aromatic or aliphatic carboxylic acid chelating agents. Examples of aromatic or aliphatic carboxylic acid chelating agents include, without limitation, oxalic acid, succinic acid, pyruvic acid malic, acid, malonic acid, salicylic acid, and anthranilic acid, and salts (for example, the sodium salts and potassium salts) thereof.

In certain embodiments, the methods and compositions (e.g., herbicidal compositions) described herein include one or more phosphonic acid type chelating agents. Examples of phosphonic acid type chelating agents include, without limitation, iminodimethylphosphonic acid (IDP), alkyldiphosphonic acids (ADPAs) and salts (for example, the sodium salts and potassium salts) thereof.

In certain embodiments, the methods and combinations (e.g., herbicidal compositions) described herein include one or more hydroxycarboxylic acid chelating agents. Examples of the hydroxycarboxylic acid type chelating agents include, without limitation, malic acid, citric acid, glycolic acid, heptonic acid, tartaric acid and salts (for example, the sodium salts and potassium salts) thereof.

In some embodiments, the one or more chelating agents can be applied as the free acid, as a salt, or combinations thereof.

In certain embodiments, each of one or more the chelating agent(s) is applied as the free acid.

In other embodiments, the chelating agent(s) can be applied as a salt. Exemplary salts include sodium salts, potassium salts, calcium salts, ammonium salts, amine salts, amide salts, and combinations thereof.

In still other embodiments, when more than one chelating agent is present, at least one of the chelating agents is applied as a free acid, and at least one of chelating agents is applied as a salt.

In some embodiments, the one or more chelating agents can be applied as a metal chelate, e.g., an alkali metal chelate, e.g., including calcium and magnesium.

In certain of the salt and/or chelate embodiments, the metal component is other than a transition metal, e.g., other than copper ions, iron ions, manganese ions, nickel ions, zinc ions, and combinations thereof; e.g., other than iron ions, such as $Fe^{+2}$ ions, $Fe^{+3}$ ions, and mixtures thereof.

In certain embodiments, component (2) is substantially free of a source of metal ions (e.g., metal salts, e.g., metal chlorides, metal sulfates, metal nitrates, metal citrates, metal phosphates, metal sulfides, metal sulfites, metal succinates, metal gluconates, metal lactates, metal formates, metal nitrites, metal salicylates, metal carboxylic acids) and/or component (2) is substantially free of one or more chelating agents having one or more chelated, complexed, or sequestered metal ions (e.g., transition metal ions).

[3] Adjuvants

In certain embodiments, the methods and compositions (e.g., herbicidal compositions) described herein include one or more agriculturally suitable adjuvants.

In some embodiments, each of the one or more agriculturally suitable adjuvants is independently selected from the group consisting of one or more activator adjuvants (e.g., one or more surfactants; one or more oil adjuvants, e.g., one or more penetrants) and one or more utility adjuvants (e.g., one or more wetting or spreading agents; one or more humectants; one or more emulsifiers; one or more dyes or pigments; one or more drift control agents; one or more thickening agents; one or more deposition agents; one or more water conditioners; one or more buffers; one or more anti-foaming agents; one or more UV blockers; one or more antioxidants; one or more fertilizers, nutrients, and/or micronutrients; and/or one or more herbicide safeners). Exemplary adjuvants are provided in Hazen, J. L. *Weed Technology* 14: 773-784 (2000), which is incorporated by reference in its entirety.

In some embodiments, a composition provided herein includes one or more surfactants. A surfactant can fall into one of four groups based on its ability to ionize in aqueous solution (i.e. nonionic surfactants, anionic surfactants, cationic surfactants, and amphoteric surfactants). Non-limiting examples of suitable surfactants include nonylphenol with 9 moles of ethylene oxide (NP-9); iso-tridecanol with 6 moles of ethylene oxide (TDA-6), ethylene oxide/propylene oxide (A-B-A) block copolymer, trisiloxane with 7 moles ethylene oxide and methyl cap (Silwet L-77® Surfactant), sodium di-octyl sulfosuccinate, lauryl ether (2) sulfate, and nonylphenol+9 EO monophosphate ester.

In some embodiments, the surfactant is a silicone surfactant. For example, the silicone surfactant is (or includes) a silicone polyether. In certain implementations, the silicone surfactant is (or includes) a silicone polyether having a suitable alkoxy group with hydrogen end groups (H-capped), methyl end groups ($CH_3$-capped), or acetyl end groups ($COCH_3$-capped). In certain implementations, the silicone surfactant is (or includes) a trisiloxane having a suitable alkoxy group with hydrogen end groups (H-capped), methyl end groups ($CH_3$-capped), or acetyl end groups ($COCH_3$-capped).

In certain implementations, the silicone surfactant is (or includes) an H-capped dimethyl methyl (polyethylene oxide) silicone polymer; e.g., having a molecular weight (or relative molar mass) from 200 to 6000.

In certain implementations, the silicone surfactant is (or includes) an H-capped trisiloxane.

In certain implementations, the silicone surfactant is (or includes) a silicone copolyol, containing a hydrogen end group and one pendant polyethylene oxide group and has an average molecular weight between about 600 to about 1000 Daltons. In certain implementations, the silicone surfactant is (or includes) a trisiloxane with an ethoxylated alkyl group having a hydrogen end group (H-End); e.g., having a number of ethoxylation groups in the range of 1-20. In certain implementations, the silicone surfactant the silicone surfactant is (or includes) a methyl (propylhydroxide, ethoxylated) bis (trimethylsiloxy) silane; e.g., a dimethyl, methyl (polyethylene oxide) silicone polymer.

In some implementations, commercial preparations of the silicone surfactants may or may not contain small amounts of polyethylene glycols (PEG) or other low molecular weight polydimethyl siloxanes (PDMS).

In some implementations, the silicone surfactant further includes a polyethylene glycol. In certain implementations, the polyethylene glycol has a relatively low molecular weight, e.g. from 300 Daltons to 1500 Daltons. In certain implementations, the polyethylene glycol is a low molecular weight polyethylene glycol allyl ether, such as a low molecular weight polyethylene glycol mono-allyl ether having an average molecular of from about 300 to about 600 Daltons and having from 1 to 20 moles of ethylene glycol with an average ethylene oxide unit (EO) of 8 to 10. Non-limiting examples of suitable polyethylene glycols may include Polyglykol A500 (available from Clamant). In certain implementations, the silicone surfactant includes from 10 to 30 weight percent of a polyethylene glycol as described anywhere herein.

Non-limiting examples of suitable silicone surfactants may include Sylgard™ 309 (available from Dow Corning, Midland, Mich., USA), Silfsurf™ A008-UP (available from Siltech Corp. Toronto, ON, Canada), Lambent MFF 199 SW (available from Lambent Technologies Corp., Gurnee, Ill., USA), and Lambent MFF 159-100 (available from Lambent Technologies Corp., Gurnee, Ill., USA).

In some embodiments, a composition provided herein includes one or more oil adjuvants. For example, a composition may include one or more paraffinic and/or vegetable oils.

A composition provided herein may include one or more humectants. Exemplary humectants include glycerin, propylene glycol, diethylene glycol, polyethylene glycol, urea, diammonium sulfate.

In some embodiments, a composition provided herein can include one or more emulsifiers. In some implementations, the emulsifier is (or includes) one (or more of the following) a natural or synthetic alcohol ethoxylate, an alcohol alkoxylate, an alkyl polysaccharide, a glycerol oleate, a polyoxyethylene-polyoxypropylene block copolymer, an alkyl phenol ethoxylate, a polymeric surfactant, a polyethylene glycol, a sorbitan fatty acid ester ethoxylate, or any combination thereof.

In certain implementations, the emulsifier is (or includes) a natural or synthetic alcohol ethoxylate, a polymeric surfactant, a sorbitan fatty acid ester, or any combination thereof.

In certain implementations, the natural or synthetic alcohol ethoxylate is a polyoxyethylene (4 to 12) lauryl ether (CI 2), polyoxyethylene (10) cetyl ether (CI 6), polyoxyethylene (10) stearyl ether (CI 8), polyoxyethylene (10) oleyl ether (CI 8 mono-unsaturated), a polyoxyethylene (2 to 11) C12-C15 alcohol, a polyoxyethylene (3 to 9) C11-C14 alcohol, a polyoxyethylene (9) C12-C14 alcohol, a polyoxyethylene (11) CI 6-C18 alcohol, a polyoxyethylene (20) C12-C15 alcohol, or any combination thereof. For example, the natural or synthetic alcohol ethoxylate can be a polyoxyethylene (4 to 7) lauryl ether (CI 2), polyoxyethylene (10) cetyl ether (CI 6), a polyoxyethylene (2 to 11) C12-C15 alcohol, apolyoxyethylene (3 to 9) C11-C14 alcohol, apolyoxyethylene (9) C12-C14 alcohol, or any combination thereof. As another example, the alcohol alkoxylate can be a butyl ether polyoxyethylene/polyoxypropylene block copolymer.

In certain implementations, the emulsifier is (or includes) an alkyl polysaccharide, e.g., a C8-C11 alkylpolysaccharide or any combination thereof.

In certain implementations, the emulsifier is (or includes) a glycerol oleate, e.g., a glycerol mono-, di-, tri-oleate, or any combination thereof.

In certain implementations, the emulsifier is (or includes) a polyoxyethylene-polyoxypropylene block copolymer, e.g., a polyoxyethylene-polyoxypropylene block copolymer having a molecular weight (or relative molar mass) of from 1100 to about 11400 and 10 to 80% (ethylene oxide) EQ.

In certain implementations, the emulsifier is (or includes) an alkyl phenol ethoxylate, e.g., a nonyl phenol ethoxylate, a dodecyl phenol ethoxylate, or any combination thereof. For example, the nonyl phenol ethoxylate can be a polyoxyethylene (2 to 8) nonylphenol.

In certain implementations, the emulsifier is (or includes) a polymeric surfactant, e.g., a graft copolymer, a random copolymer, or any combination thereof. For example, the graft copolymer can be a polymethacrylic acid and acrylate with polyoxyethylene chains. For example, the random copolymer can be a random copolymer having ester and ether groups.

In certain implementations, the emulsifier is (or includes) a polyethylene glycol, e.g., a polyethylene glycol having a molecular weight ("MW") (or relative molar mass) of from 200 to 8000, e.g., MW 400 PEG dioleate; or MW600 PEG dioleate.

In certain implementations, the emulsifier is (or includes) a sorbitan fatty acid ester ethoxylate, e.g., polyoxyethylene (20) sorbitan tristearate, polyoxyethylene (20) sorbitan monooleate, polyoxyethylene (5) sorbitan monooleate, polyoxyethylene (20) sorbitan trioleate, or any combination thereof. For example, the sorbitan fatty acid ester can be a sorbitan tristearate, a sorbitan triolate, or any combination thereof. In certain implementations, the emulsifier is (or includes) an alkyl phenol ethoxylate, a mixture of an ethoxylated alcohol and a glycerol oleate, or any combination thereof.

In certain implementations, the emulsifier is (or includes) a mixture of an ethoxylated alcohol and a glycerol oleate, e.g.: a CIO to C16 alcohol ethoxylate and a glycerol oleate combination; or polyoxyethylene lauryl ether, CIO to CI 6 alcohol ethoxylates, and glycerol oleate; or ethoxylated alcohols having primary C5-C20 carbon chains with an average of about 2 to about 7 ethoxylation groups, and a glycerol oleate; or a polyoxyethylene (11) C16-18 alcohol.

In certain implementations, the emulsifier is (or includes) a sorbitan tristearate. Non-limiting examples of suitable emulsifiers include Brij L4 (available from Croda), AL3273 (available from Croda), PC Emuls Green (available from Petro-Canada, Calgary, AB, Canada), Tween 20 (Croda), Crodafos T6A (Croda).

In some embodiments, a composition provided herein can include one or more pigments. The pigments can provide color to the plant being treated (e.g., turf grass). In some implementations, the pigment is a water-based pigment dispersion. In some implementations, the pigment is an oil-based pigment dispersion.

In some implementations, the pigment is a phthalocyanine compound. In certain embodiments, the pigment is a metal-free phthalocyanine compound. In certain implementations, the pigment is a halogenated, metal-free phthalocyanine, e.g., a polychlorinated metal-free phthalocyanine.

In certain implementations, the pigment is a metal phthalocyanine compound. For example, the pigment can be a copper phthalocyanine. In certain implementations, the copper phthalocyanine is a non-halogenated copper phthalocyanine, e.g., a nonchlorinated copper phthalocyanine. As an example, the pigment can be Phthalocyanine Blue BN (CAS 147-14-8). In certain implementations, the copper phthalocyanine is a halogenated copper phthalocyanine. As an example, the pigment can be Phthalocyanine Green 6G (CAS 14302-13-7). As another example, the pigment can be polychlorinated (Cu II) phthalocyanine, such as Phthalocyanine Green G (CAS 1328-45-6 and 1328-53-6).

Non-limiting examples of suitable pigments include Sunsperse™ Green 7 (Pigment Green 7 dispersed in water, available from Sun Chemical Corp. Performance Pigments Cincinnati, Ohio, USA), Sunsperse™ EXP 006-102 and 006-95B (Pigment Green 7 dispersed in oil, available from Sun Chemical Corp. Performance Pigments, Cincinnati, Ohio, USA), and Pigment Green 7 powder (available from Hercules Exports, Mumbai, India).

In some embodiments, one or more fertilizers, nutrients, and/or micronutrients are added to the formulation. Non-limiting examples of such components include macronutrients such as carbon, nitrogen, phosphorous, potassium, magnesium, sulfur, and calcium. Such macronutrients may be added in any known form including, for example, as salts. Non-limiting examples of micronutrients include, for example, iron, manganese, chlorine, copper, boron, molybdenum, cobalt, zinc, and nickel. As with the macronutrients, any known form may be added including salts of the various micronutrients.

In certain embodiments, one or more agriculturally suitable adjuvants (e.g., one or more surfactants) is/are added to reduce the surface tension of, e.g., a spray solution, which facilitates spray droplets' spreading beyond their initial contact area. Increasing the coverage area generally increases herbicide absorption.

In certain embodiments, one or more agriculturally suitable adjuvants (e.g., one or more humectants) is/are added to increases the drying time of, e.g., a spray droplet, after application to unwanted vegetation. Herbicide absorption optimally occurs when the herbicide is in solution. As such, slowing the rate at which droplets dry can potentially allow more time for absorption, e.g., particularly under hot, dry conditions.

In certain embodiments, one or more agriculturally suitable adjuvants (e.g., one or more oil adjuvants, e.g., a paraffinic oil; e.g., further including one or more emulsifiers) is/are added to enhance cuticular penetration by, e.g., softening, plasticizing, or dissolving cuticular waxes and allowing herbicide movement to the more hydrophilic regions underneath.

In certain embodiments, each of the one or more agriculturally suitable adjuvants is independently selected from the group consisting of one or more humectants, one or more oil adjuvants, e.g., penetrants; one or more surfactants, one or more emulsifiers, and one or more wetting or spreading agents.

In certain embodiments, each of the one or more agriculturally suitable adjuvants is independently selected from the group consisting of one or more humectants, one or more oil adjuvants, e.g., penetrants; and one or more emulsifiers.

In certain embodiments, each of the one or more agriculturally suitable adjuvants is independently selected from the group consisting of one or more humectants and one or more emulsifiers.

In certain embodiments, each of the one or more agriculturally suitable adjuvants is independently selected from the group consisting of a polyethylene glycol, a polypropylene glycol, propylene glycol, an oil adjuvant, and an emulsifier.

In certain embodiments, each of the one or more agriculturally suitable adjuvants is independently selected from the group consisting of a polyethylene glycol, a polypropylene glycol, propylene glycol, and an emulsifier.

In certain embodiments, each of the one or more agriculturally suitable adjuvants is independently selected from the group consisting of a polyethylene glycol, a polypropylene glycol, and propylene glycol.

In some embodiments, each of the one or more agriculturally suitable adjuvants is independently selected from urea, a micronutrient, a polymer (e.g., polyacrylic acid), and a pigment (e.g., phthalocyanine). In certain embodiments, the compositions provided herein include at least one of urea, a micronutrient, a polymer (e.g., polyacrylic acid), and a pigment (e.g., phthalocyanine).

As the skilled artisan will appreciate, an adjuvant recognized in the art as performing one particular function delineated above, may also perform one or more other functions delineated above.

Compositions and Methods of Use (A) Combination Compositions Provided herein are methods and combination compositions including one or more indole auxins or an agriculturally suitable salt thereof (1) and one or more chelating agents or an agriculturally suitable salt thereof (2). For example, the methods and combination compositions provided herein can include:

(1) indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof; and (2) one or more chelating agents or one or more agriculturally suitable salts thereof.

In some embodiments, the methods and combination compositions (e.g., herbicidal compositions) described herein include:

(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (2) one or more (e.g., one) chelating agents or one or more agriculturally suitable salts thereof.

In certain embodiments, the methods and combination compositions (e.g., herbicidal compositions) described herein include:

(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (2) one or more (e.g., one) chelating agents or one or more agriculturally suitable salts thereof, in which each of (or at least one of) the one or more chelating agents is an independently selected aminopolycarboxylic acid chelating agent or an agriculturally suitable salt thereof.

In certain embodiments, the methods and combination compositions (e.g., herbicidal compositions) described herein include:

(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (2) one or more (e.g., one) chelating agents or one or more agriculturally suitable salts thereof, in which each of (or at least one of) the one or more chelating agents is independently selected from ethylenediaminetetraacetic acid (EDTA), diethylenetriaminepentaacetic acid (DTPA), hydroxyethylenediaminetriacetic acid (HEDTA), and ethylenediaminedisuccinate (EDDS); an agriculturally suitable salt thereof.

In certain embodiments, the methods and combination compositions (e.g., herbicidal compositions) described herein include:

(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (2) ethylenediaminetetraacetic acid (EDTA) or an agriculturally suitable salt thereof.

In certain embodiments, the methods and combination compositions (e.g., herbicidal compositions) described herein include:

(1) IBA or an agriculturally suitable salt thereof; and (2) ethylenediaminetetraacetic acid (EDTA) or an agriculturally suitable salt thereof.

In some embodiments (including any of the combinations described above), the weight ratio of (1):(2) is 1:100 (e.g., 1:50, 1:40, 1:30, 1:20, 1:10, 1:5, 1:4, 1:3, 1:2, or 1:1; e.g., 1:5). In some embodiments, the weight ratio of (1):(2) is about 1:8.

In some embodiments (including any of the combinations described above), the weight ratio of (1):(2) is from 1:1 to 1:100 (e.g., from 1:1 to 1:50, from 1:1 to 1:40, from 1:1 to 1:30, from 1:1 to 1:20, from 1:1 to 1:10). In some embodiments, the weight ratio of (1):(2) is from about 1:6 to about 1:10.

In certain embodiments, (including any of the combinations described above), the weight ratio of (1):(2) is from 1:1 to 1:10 (e.g., from 1:1 to 1:5, from 1:1 to 1:3, from 1:1 to 1:2, from 1:2 to 1:10, from 1:2 to 1:8; from 1:2 to 1:5, from 1:3 to 1:10, from 1:3 to 1:7; from 1:3 to 1:5; from 1:4 to 1:5; from 1:4 to 1:6; from 1:6 to 1:10; from 1:7 to 1:9).

In certain embodiments (including any of the combinations described above), the weight ratio of (1):(2) is from 1:1 to 1:5 (e.g., from 1:1 to 1:3, from 1:1 to 1:2, from 1:2 to 1:5, from 1:3 to 1:5; from 1:4 to 1:5; from 1:6 to 1:10; from 1:7 to 1:9).

In some embodiments (including any of the combinations described in above), (1) and (2) represent at least 50 weight percent (e.g., at least 80 weight percent, at least 90 weight percent, at least 95 weight percent, at least 99 weight percent) of the combinations (e.g., herbicidal compositions) described herein. In certain of these embodiments, the combinations (e.g., herbicidal compositions) described herein consist of (1) and (2). In certain of these embodiments, the combinations (e.g., herbicidal compositions) described herein consist essentially of (1) and (2).

In some embodiments (including any of the combinations described in above):

the weight ratio of (1):(2) is from 1:1 to 1:50 (e.g., from 1:1 to 1:10, e.g., from 1:1 to 1:5, from 1:1 to 1:3, from 1:1 to 1:2, from 1:2 to 1:10, from 1:2 to 1:8; from 1:2 to 1:5, from 1:3 to 1:10, from 1:3 to 1:7; from 1:3 to 1:5; from 1:4 to 1:5; from 1:4 to 1:6; from 1:6 to 1:10; from 1:7 to 1:9); and (1) and (2) represent at least 50 weight percent (e.g., at least 80 weight percent, at least 90 weight percent, at least 95 weight percent, at least 99 weight percent) of the combinations (e.g., herbicidal compositions) described herein; or the combinations (e.g., herbicidal compositions) described herein consist essentially of (1) and (2); or the combinations (e.g., herbicidal compositions) described herein consist of (1) and (2)

In some embodiments, the methods, compositions, and combinations (e.g., including any of the combinations described above) described herein can further include one or more agriculturally suitable adjuvants. These embodiments can include any one or more of the features described below.

In certain embodiments, each of the one or more agriculturally suitable adjuvants is independently selected from the group consisting of an activator adjuvant and a utility adjuvant.

In certain embodiments, each of (or at least one of) the one or more agriculturally suitable adjuvants is independently selected from the group consisting of a humectant, a penetrant, a surfactant, an emulsifier, and a wetting or spreading agent.

In certain embodiments, each of (or at least one of) the one or more agriculturally suitable adjuvants is independently selected from the group consisting of a polyethylene glycol, a polypropylene glycol, propylene glycol, an oil adjuvant, and an emulsifier.

In certain embodiments, each of (or at least one of) the one or more agriculturally suitable adjuvants is independently selected from the group consisting of a polyethylene glycol, a polypropylene glycol, propylene glycol, and an emulsifier.

In certain embodiments, each of (or at least one of) the one or more agriculturally suitable adjuvants is independently selected from the group consisting of a polyethylene glycol, a polypropylene glycol, and propylene glycol.

In some embodiments, the methods and compositions provided herein also include one or more basic compounds. In certain embodiments, the methods and compositions provided herein include a bicarbonate (e.g., a sodium or potassium bicarbonate). In some embodiments, the ratio of (1) to base is about 0.5:2 to about 2:0.5 (e.g., about 1:1). For example, the ratio of (1) to bicarbonate (e.g., potassium bicarbonate) can be about 0.5:2 to about 2:0.5 (e.g., about 1:1).

In some embodiments (including any of the combinations described above), the weight ratio of (1): the one or more agriculturally suitable adjuvants is 1:100 (e.g., 1:50, 1:40, 1:30, 1:20, 1:10, 1:5, 1:4, 1:3, 1:2, or 1:1; e.g., 1:5).

In some embodiments (including any of the combinations described above), the weight ratio of (1): the one or more agriculturally suitable adjuvants is from 1:1 to 1:100 (e.g., from 1:1 to 1:50, from 1:1 to 1:40, from 1:1 to 1:30, from 1:1 to 1:20, from 1:1 to 1:10; from 1:1 to 1:15; from 1:5 to 1:15).

In certain embodiments, (including any of the combinations described above), the weight ratio of (1): the one or more agriculturally suitable adjuvants is from 1:1 to 1:10 (e.g., from 1:1 to 1:5, from 1:1 to 1:3, from 1:1 to 1:2, from 1:2 to 1:10, from 1:2 to 1:8; from 1:2 to 1:5, from 1:3 to 1:10, from 1:3 to 1:7; from 1:3 to 1:5; from 1:4 to 1:5; from 1:4 to 1:6; from 1:8 to 1:12; from 1:5 to 1:15).

In certain embodiments, (including any of the combinations described above), the weight ratio of (1): the one or more agriculturally suitable adjuvants is from 1:1 to 1:5 (e.g., from 1:1 to 1:3, from 1:1 to 1:2, from 1:2 to 1:5, from 1:3 to 1:5; from 1:4 to 1:5; from 1:8 to 1:12; from 1:5 to 1:15).

In some embodiments (including any of the combinations described above), (1), (2), and the one or more agriculturally suitable adjuvants represent at least 50 weight percent (e.g., at least 80 weight percent, at least 90 weight percent, at least 95 weight percent, at least 99 weight percent) of the combinations (e.g., herbicidal compositions) described herein. In certain of these embodiments, the combinations (e.g., herbicidal compositions) described herein consist essentially of (1), (2), and the one or more agriculturally suitable adjuvants. In certain of these embodiments, the combinations (e.g., herbicidal compositions) described herein consist of (1), (2), and the one or more agriculturally suitable adjuvants.

In some embodiments (including those combinations described above):
- the weight ratio of (1): the one or more agriculturally suitable adjuvants is from 1:1 to 1:50 (e.g., from 1:1 to 1:10, e.g., from 1:1 to 1:5, from 1:1 to 1:3, from 1:1 to 1:2, from 1:2 to 1:10, from 1:2 to 1:8; from 1:2 to 1:5, from 1:3 to 1:10, from 1:3 to 1:7; from 1:3 to 1:5; from 1:4 to 1:5; from 1:4 to 1:6; from 1:8 to 1:12; from 1:5 to 1:15); and
- (1), (2), and the one or more agriculturally suitable adjuvants represent at least 50 weight percent (e.g., at least 80 weight percent, at least 90 weight percent, at least 95 weight percent, at least 99 weight percent) of the combinations (e.g., herbicidal compositions) described herein; or the combinations (e.g., herbicidal compositions) described herein consist essentially of (1), (2), and the one or more agriculturally suitable adjuvants; or the combinations (e.g., herbicidal compositions) described herein consist of (1), (2), and the one or more agriculturally suitable adjuvants.

In some embodiments (including those combinations described above):
- the weight ratio of (1):(2) is from 1:1 to 1:50 (e.g., from 1:1 to 1:10, e.g., from 1:1 to 1:5, from 1:1 to 1:3, from 1:1 to 1:2, from 1:2 to 1:10, from 1:2 to 1:8; from 1:2 to 1:5, from 1:3 to 1:10, from 1:3 to 1:7; from 1:3 to 1:5; from 1:4 to 1:5; from 1:4 to 1:6);
- the weight ratio of (1): the one or more agriculturally suitable adjuvants is from 1:1 to 1:50 (e.g., from 1:1 to 1:10, e.g., from 1:1 to 1:5, from 1:1 to 1:3, from 1:1 to 1:2, from 1:2 to 1:10, from 1:2 to 1:8; from 1:2 to 1:5, from 1:3 to 1:10, from 1:3 to 1:7; from 1:3 to 1:5; from 1:4 to 1:5; from 1:4 to 1:6; and
- (1), (2), and the one or more agriculturally suitable adjuvants represent at least 50 weight percent (e.g., at least 80 weight percent, at least 90 weight percent, at least 95 weight percent, at least 99 weight percent) of the combinations (e.g., herbicidal compositions) described herein; or the combinations (e.g., herbicidal compositions) described herein consist essentially of (1), (2), and the one or more agriculturally suitable adjuvants; or the combinations (e.g., herbicidal compositions) described herein consist of (1), (2), and the one or more agriculturally suitable adjuvants.

In some embodiments (including any of the combinations described above), the one or more indole auxins are present in the compositions in an amount ranging from about 0.05 to about 5% by weight (e.g., about 0.1 to about 5%, about 0.2 to about 5%, about 0.25 to about 5%, about 0.5 to about 5%, about 0.75 to about 5%, about 1 to about 5%, about 2 to about 5%, about 3 to about 5%, about 0.05 to about 4%, about 0.05 to about 3%, about 0.05 to about 2.5%, about 0.05 to about 1.5%, about 0.05 to about 1%, about 0.05 to about 0.5%, about 0.05 to about 0.25%, about 0.05 to about 0.15%, about 0.1 to about 1%, about 0.25 to about 2.5%, about 0.5 to about 2%, about 0.1 to about 4%, about 0.15 to about 3%) of the composition. For example, the one or more indole auxins can be present in an amount of about 0.5 to about 2% by weight of the composition.

In some embodiments (including any of the combinations described above), the one or more chelators are present in the compositions in an amount ranging from about 0.1 to about 10% by weight (e.g., about 0.1 to about 8%, about 0.1 to about 7.5%, about 0.1 to about 6%, about 0.1 to about 5%, about 0.1 to about 3%, about 0.1 to about 2%, about 0.1 to about 1%, about 0.1 to about 0.5%, about 0.25 to about 10%, about 0.5 to about 10%, about 1 to about 10%, about 2.5 to about 10%, about 5 to about 10%, about 7.5 to about 10%, about 0.5 to about 8%, about 1 to about 5%, about 0.75 to about 7.5%, about 2 to about 4%) of the composition. For example, the one or more chelators can be present in an amount of about 1 to about 5% by weight of the composition.

Combination compositions including (1) and (2) can be formulated to prepare an herbicidal composition that is selective (i.e. it is useful in controlling or eradicating the growth of undesired vegetation (e.g., broadleaf weeds) while not impacting or minimally impacting desired vegetation (e.g., turf grass).

In some such embodiments (including any of the combinations described above), a selective herbicidal composition can include one or more indole auxins in an amount ranging from about 0.05 to about 5% by weight (e.g., about 0.1 to about 5%, about 0.2 to about 5%, about 0.25 to about 5%, about 0.5 to about 5%, about 0.75 to about 5%, about 1 to about 5%, about 2 to about 5%, about 3 to about 5%, about 0.05 to about 4%, about 0.05 to about 3%, about 0.05 to about 2.5%, about 0.05 to about 1.5%, about 0.05 to about 1%, about 0.05 to about 0.5%, about 0.05 to about 0.25%, about 0.05 to about 0.15%, about 0.1 to about 1%, about 0.25 to about 2.5%, about 0.5 to about 2%, about 0.1 to about 4%, about 0.15 to about 3%) of the composition; and one or more chelators present in an amount ranging from about 0.1 to about 10% by weight (e.g., about 0.1 to about 8%, about 0.1 to about 7.5%, about 0.1 to about 6%, about 0.1 to about 5%, about 0.1 to about 3%, about 0.1 to about 2%, about 0.1 to about 1%, about 0.1 to about 0.5%, about 0.25 to about 10%, about 0.5 to about 10%, about 1 to about 10%, about 2.5 to about 10%, about 5 to about 10%, about 7.5 to about 10%, about 0.5 to about 8%, about 1 to about 5%, about 0.75 to about 7.5%, about 2 to about 4%) of the composition. For example, the one or more indole auxins can be present in an amount of about 0.5 to about 2% by weight of the composition; and the one or more chelators can be present in an amount of about 1 to about 5% by weight of the composition.

It has been observed that applying only component (1) or applying only component (2) to unwanted vegetation generally does not result in effective herbicidal activity (e.g., weak and/or nonselective activity is observed, e.g., when applied at lower, practical working component concentrations and/or unacceptable phytotoxicity is observed in surrounding, desired vegetation, e.g., when applied at higher component concentrations). In contrast, and to the surprise of the inventors, applying components (1) and (2) in combination provides one or more of the following advantageous results.

In some embodiments, the efficacy shown by applying (1) and (2) in combination is greater than the efficacy shown by applying either of (1) or (2) alone.

In certain embodiments, applying (1) and (2) in combination shows a synergistic herbicidal effect (e.g. more root damage, less regrowth of weeds following application of the combination).

In certain embodiments, applying (1) and (2) in combination shows better selectivity on weed control (e.g. less damage on turf grass) A combination having two or more components exhibits synergy when it produces a result that is greater than the expected sum of the individual component contributions. Methods for determining whether herbicidal and fungicidal combinations exhibit synergy are discussed, e.g., in the following references: S. R. Colby, "Calculating synergistic and antagonistic responses of herbicide combinations", *Weeds* 15, 20-22 (1967); and Burpee et al., Reassessment of Fungicide Synergism for Control of Dollar Spot, *Plant Disease* 2008, 92, 601-606.

That is, and referring to the terminology of the Colby and Burpee references (supra), a combination exhibits synergy when the observed response for the combination is greater than the expected response for the combination.

The expected response (E) for a two-component combination can be calculated using equation (a) below (cf: Colby and Burpee):

$$E = X + [Y(100-X)]/100 \tag{a}$$

X is the percent disease control in plots treated with a first component of the combination.

Y is the percent disease control in plots treated with a second component of the combination.

The percent disease control values X and Y can, in turn, be calculated using equation (b) below:

$$\text{percent disease control} = [(W-Z)/W] \times 100 \tag{b}$$

W is disease severity in untreated plot.

Z is disease severity in treated plot.

In another advantageous aspect of the invention, the synergistic effect allows the effective applied dosage of each component to be less (e.g., 50% percent less) than the observed phytotoxic dose of each component alone.

In some embodiments, applying (1) and (2) in combination selectively controls the unwanted vegetation (e.g., broadleaf weeds) in the presence of a desired vegetation (e.g., a turf grass).

Selectivity can be assessed, e.g., using a visually-based plant damage test in which both the unwanted vegetation and the desired vegetation are graded using a qualitative rating scale from 0 to 10: 0=No damage; 1=Trace of damage; 2=Trace to slight damage; 3=Slight damage; 4=Slight to moderate damage; 5=Moderate damage; 6=Moderate to severe damage; 7=Severe damage; 8=Very severe damage; and 10=Plant dead.

In certain embodiments, applying (1) and (2) in combination achieves a damage rating of "5" or higher (e.g., 4-9, 4-8, 4-7, 5-9, 5-8, 5-7, 6-9, 6-8, 7-9, 8-9, 9) for the unwanted vegetation and a damage rating of from "0" to "4" (e.g., 0-2, 0-1, 0) for the desired vegetation.

In some embodiments, applying (1) and (2) in combination systemically controls the unwanted vegetation. As used herein, "systemically controls" means that applying (1) and (2) in combination alters (e.g., damages) one or more parts of the unwanted vegetation (e.g., root system) to an extent that regrowth ability of the affected unwanted vegetation is partially or fully compromised (e.g., applying (1) and (2) in combination results in death of the unwanted vegetation).

Solutions of indole auxins (e.g., IBA), exhibit a strong odor when used at the concentrations provided herein. It was surprisingly found that combinations of (1) and (2) exhibited a significantly decreased odor. Such a feature may contribute to the a stronger consumer acceptance or response to use of the combination compositions provided herein.

Also provided herein are methods and combination compositions including one or more indole auxins or an agriculturally suitable salt thereof (1) and one or more agriculturally suitable adjuvants (3). For example, the methods and combination compositions provided herein can include:

(1) indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof; and (3) one or more agriculturally suitable adjuvants.

In some embodiments, the methods and combination compositions (e.g., herbicidal compositions) described herein include:
(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (3) one or more (e.g., one) agriculturally suitable adjuvants.

In certain embodiments, the methods and combination compositions (e.g., herbicidal compositions) described herein include:
(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (3) one or more (e.g., one) agriculturally suitable adjuvants, in which each of (or at least one of) the one or more one or more agriculturally suitable adjuvants is independently selected from the group consisting of one or more activator adjuvants (e.g., one or more surfactants; one or more oil adjuvants, e.g., one or more penetrants) and one or more utility adjuvants (e.g., one or more wetting or spreading agents; one or more humectants; one or more emulsifiers; one or more dyes or pigments; one or more drift control agents; one or more thickening agents; one or more deposition agents; one or more water conditioners; one or more buffers; one or more anti-foaming agents; one or more UV blockers; one or more antioxidants; one or more fertilizers and/or micronutrients; and/or one or more herbicide safeners).

In certain embodiments, the methods and combination compositions (e.g., herbicidal compositions) described herein include:
(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (3) one or more (e.g., one) agriculturally suitable adjuvants, in which each of (or at least one of) the one or more agriculturally suitable adjuvants is independently selected from one or more humectants, one or more oil adjuvants, e.g., penetrants; one or more surfactants, one or more emulsifiers, one or more pigments, and one or more wetting or spreading agents.

In certain embodiments, the methods and combination compositions (e.g., herbicidal compositions) described herein include:
(1) one or more (e.g., one) indole auxins selected from the group consisting of: indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof (e.g., one auxin is present, which is IBA or an agriculturally suitable salt thereof); and (3) one or more (e.g., one) agriculturally suitable adjuvants, in which each of (or at least one of) the one or more agriculturally suitable adjuvants is independently selected from propylene glycol, urea, a polymer (e.g., polyacrylic acid, polyethylene glycol, a polypropylene glycol), and a pigment (e.g., phthalocyanine).

In certain embodiments, the methods and combination compositions (e.g., herbicidal compositions) described herein include:
(1) IBA or an agriculturally suitable salt thereof; and
(3) one or more (e.g., one) agriculturally suitable adjuvant, in which each of (or at least one of) the one or more agriculturally suitable adjuvants is independently selected from urea, a polymer (e.g., polyacrylic acid), and a pigment (e.g., phthalocyanine).

In some embodiments (including any of the combinations described above), the weight ratio of (1): the one or more agriculturally suitable adjuvants is 1:100 (e.g., 1:50, 1:40, 1:30, 1:20, 1:10, 1:5, 1:4, 1:3, 1:2, or 1:1; e.g., 1:5).

In some embodiments (including any of the combinations described above), the weight ratio of (1): the one or more agriculturally suitable adjuvants is from 1:1 to 1:100 (e.g., from 1:1 to 1:50, from 1:1 to 1:40, from 1:1 to 1:30, from 1:1 to 1:20, from 1:1 to 1:10; from 1:1 to 1:15; from 1:5 to 1:15).

In certain embodiments, (including any of the combinations described above), the weight ratio of (1): the one or more agriculturally suitable adjuvants is from 1:1 to 1:10 (e.g., from 1:1 to 1:5, from 1:1 to 1:3, from 1:1 to 1:2, from 1:2 to 1:10, from 1:2 to 1:8; from 1:2 to 1:5, from 1:3 to 1:10, from 1:3 to 1:7; from 1:3 to 1:5; from 1:4 to 1:5; from 1:4 to 1:6; from 1:8 to 1:12; from 1:5 to 1:15).

In certain embodiments, (including any of the combinations described above), the weight ratio of (1): the one or more agriculturally suitable adjuvants is from 1:1 to 1:5 (e.g., from 1:1 to 1:3, from 1:1 to 1:2, from 1:2 to 1:5, from 1:3 to 1:5; from 1:4 to 1:5; from 1:8 to 1:12; from 1:5 to 1:15).

In some embodiments (including any of the combinations described above), (1) and the one or more agriculturally suitable adjuvants represent at least 50 weight percent (e.g., at least 80 weight percent, at least 90 weight percent, at least 95 weight percent, at least 99 weight percent) of the combinations (e.g., herbicidal compositions) described herein. In certain of these embodiments, the combinations (e.g., herbicidal compositions) described herein consist essentially of (1) and the one or more agriculturally suitable adjuvants. In certain of these embodiments, the combinations (e.g., herbicidal compositions) described herein consist of (1) and the one or more agriculturally suitable adjuvants.

In some embodiments (including any of the combinations described above), the one or more indole auxins are present in the compositions in an amount ranging from about 0.5 to about 5% by weight (e.g., about 0.75 to about 5%, about 1 to about 5%, about 2 to about 5%, about 3 to about 5%, about 0.5 to about 4%, about 0.5 to about 3%, about 0.5 to about 2.5%, about 0.5 to about 1.5%, about 0.5 to about 1%, about 1 to about 4%, about 2 to about 4%, about 2.5% to about 5%, about 2 to about 3%, 1.5 to about 4.5%) of the composition. For example, the one or more indole auxins can be present in an amount of about 2 to about 4% by weight of the composition.

Combinations including (1) and (3) can be formulated to prepare an herbicidal composition (i.e. it is useful in controlling or eradicating the growth of undesired vegetation.

In some such embodiments (including any of the combinations described above), a selective herbicidal composition can include one or more indole auxins in an amount ranging from the one or more indole auxins are present in the compositions in an amount ranging from about 0.5 to about 5% by weight (e.g., about 0.75 to about 5%, about 1 to about 5%, about 2 to about 5%, about 3 to about 5%, about 0.5 to about 4%, about 0.5 to about 3%, about 0.5 to about 2.5%, about 0.5 to about 1.5%, about 0.5 to about 1%, about 1 to about 4%, about 2 to about 4%, about 2.5% to about 5%, about 2 to about 3%, 1.5 to about 4.5%) of the composition; and less than 10% by weight of one or more agriculturally acceptable adjuvants (e.g., 0.5 to 10%, 1 to 10%, 2 to 10%, 4 to 10%, 6 to 10%, 7.5 to 10%, 0.5 to 7.5%, 0.5 to 5%, 0.5 to 3%, 0.5 to 2.5%, 0.5 to 1.5%, 1 to 6%, 2 to 5%, 1 to 8%, 2.5 to 7.5%). For example, the one or more indole auxins can be present in an amount of about 2.5 to about 5% of the composition.

Combinations including (1) and (3) can be formulated to prepare an herbicidal composition that is nonselective.

In some such embodiments (including any of the combinations described above), a selective herbicidal composition can include one or more indole auxins in an amount ranging from the one or more indole auxins are present in the compositions in an amount ranging from about 0.5 to about 5% by weight (e.g., about 0.75 to about 5%, about 1 to about 5%, about 2 to about 5%, about 3 to about 5%, about 0.5 to about 4%, about 0.5 to about 3%, about 0.5 to about 2.5%, about 0.5 to about 1.5%, about 0.5 to about 1%, about 1 to about 4%, about 2 to about 4%, about 2 to about 3%, 1.5 to about 4.5%) of the composition; and about 10% or greater by weight of one or more agriculturally acceptable adjuvants (e.g., 10 to 50%, 10 to 25%, 10 to 20%, 10 to 15%, 15 to 25%, 20 to 40%, 12 to 18%). For example, the one or more indole auxins can be present in an amount of about 2 to about 4% of the composition.

In some embodiments, the methods and compositions provided herein also include one or more basic compounds. In certain embodiments, the methods and compositions provided herein include a bicarbonate (e.g., a sodium or potassium bicarbonate). In some embodiments, the ratio of (1) to base is about 0.5:2 to about 2:0.5 (e.g., about 1:1). For example, the ratio of (1) to bicarbonate (e.g., potassium bicarbonate) can be about 0.5:2 to about 2:0.5 (e.g., about 1:1). Without being bound by theory, the presence of the bicarbonate has been found to aid the solubility of the indole auxin in aqueous solution.

Any of the above embodiments can include any one or more of the following features.

The efficacy shown by applying (1) and (3) in combination can be greater than the efficacy shown by applying (1) alone. In some embodiments, applying (1) and (3) in combination can selectively control the unwanted vegetation (e.g., broadleaf weed) in the presence of a desired vegetation (e.g., when (3) is present at concentrations less than about 10% by weight). In embodiments, the desired vegetation (e.g., turf grass) is substantially unaffected. In certain embodiments, the unwanted vegetation is a broadleaf weed, and the desired vegetation is turf grass. In some embodiments, applying (1) and (3) in combination can nonselectively control the unwanted vegetation (e.g., controlling all types of vegetation including broadleaf weeds and turfgrass) (e.g., when (3) is present at concentrations greater than about 10% by weight). In certain embodiments, the unwanted vegetation includes a broadleaf weed and a turf grass. Applying (1) and (3) in combination can systemically control the unwanted vegetation.

In some embodiments (including those combinations described above), the combinations (e.g., herbicidal compositions) described herein are substantially free of water.

In some embodiments (including those combinations described in above), the combinations (e.g., herbicidal compositions) described herein include water (e.g., at most 1 weight percent of water, at most 5 weight percent of water, at most 50 weight percent of water, at most 90 weight percent of water, at most 90 weight percent of water). In certain embodiments, the water can be present as a diluent, e.g., as a diluent added prior to application of the combinations to an unwanted vegetation.

In some embodiments, the water is distilled water and/or other waters having low mineral electrolyte content.

(B) Indole Auxin Compositions

Provided herein are methods and compositions (e.g., herbicidal compositions) including an indole auxin, wherein the indole auxin is selected from the group consisting of indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof. In some embodiments, such compositions are useful as a nonselective herbicide.

In some embodiments, an indole auxin composition can include at least 5% by weight of an indole auxin. For example, the composition can include from about 5 to about 20% of an indole auxin (e.g., 5 to 15%; 7 to 15%, 10 to 20%, 12 to 16%, 6 to 12%, 5 to 10%, 10 to 15%).

In some embodiments, a composition can include at least 5% by weight of indole-3-butyric acid ("IBA") or an agriculturally suitable salt thereof. For example, the composition can include from about 5 to about 20% of an indole auxin (e.g., 5 to 15%; 7 to 15%, 10 to 20%, 12 to 16%, 6 to 12%, 5 to 10%, 10 to 15%).

Compositions including one or more indole auxin compositions can be formulated at a pH of at least 6.0. For example, the compositions can be prepared at a pH from 7.0 to 9.0. In some embodiments, the pH of the formulation can be adjusted through the addition of a basic compound (e.g., bicarbonate). For example, in certain embodiments, the compositions further comprise a bicarbonate (e.g., sodium or potassium bicarbonate).

In some embodiments, the methods and compositions provided herein include an indole auxin, wherein the indole auxin is selected from the group consisting of indole-3-acetic acid ("IAA") or an agriculturally suitable salt thereof, indole-3-butyric acid ("IBA") or an agriculturally suitable salt thereof, and indole-3-propanoic acid ("IPA") or an agriculturally suitable salt thereof; and one or more basic compounds. For example, the methods and compositions provided herein include indole-3-butyric acid ("IBA") or an agriculturally suitable salt thereof, and one or more basic compounds. In certain embodiments, the methods and compositions provided herein include indole-3-butyric acid ("IBA") or an agriculturally suitable salt thereof, and a bicarbonate (e.g., a sodium or potassium bicarbonate). In some embodiments, the ratio of (1) or indole auxin to base is about 0.5:2 to about 2:0.5 (e.g., about 1:1). For example, the ratio of (1) to bicarbonate can be about 0.5:2 to about 2:0.5 (e.g., about 1:1).

In some embodiments (including those compositions described above), the compositions (e.g., herbicidal compositions) described herein are substantially free of water.

In some embodiments (including those compositions described in above), the compositions (e.g., herbicidal compositions) described herein include water (e.g., at most 1 weight percent of water, at most 5 weight percent of water, at most 50 weight percent of water, at most 90 weight percent of water, at most 90 weight percent of water). In certain embodiments, the water can be present as a diluent, e.g., as a diluent added prior to application of the combinations to an unwanted vegetation.

In some embodiments, the water is distilled water and/or other waters having low mineral electrolyte content.

Application and Preparation of Compositions

In general, the compositions provided herein can be applied to the unwanted vegetation by conventional methods known in the art, e.g., spraying, misting, sprinkling, pouring, or any other suitable method.

Foliar Applications

In some embodiments, the compositions are applied by foliar application (e.g., by applying to the aerial exterior portion of the unwanted vegetation, e.g., to the leaves of the unwanted vegetation, e.g., by spraying the unwanted vegetation.

In some embodiments, the compositions are applied to the unwanted vegetation in a manner that minimizes contact of the compositions with other vegetation (e.g., desired vegetation, such as a turf grass).

In some embodiments, the compositions are applied to, and come into contact with, a site or area that includes unwanted vegetation and other vegetation (e.g., desired vegetation, such as a turf grass).

In some embodiments, the compositions are applied to unwanted vegetation (e.g., weed, e.g., broadleaf weed) at a rate from about 1 gallon per acre to about 500 gallons per acre.

Total application volume with water is such that sufficient water is used to ensure good coverage of the treated area. In some embodiments, the total application volume with water is from 50 to 400 gal per acre.

In some implementations, the compositions are applied to unwanted vegetation (e.g., weed, e.g., broadleaf weed) at an interval rate of, for example, from 7 days to 90 days (e.g., from 7 days to 28 days, from 7 days to 21 days, from 7 days to 14 days, from 14 days to 21 days, from 14 days to 28 days, 7 days, 10 days, 14, days, 21 days).

In some implementations, the compositions are applied by spraying (e.g., using a medium or coarse spray (ASABE standard 572) and the minimum volume mean diameter for spinning atomizer nozzles). In certain implementations, the nozzle height is at most about four feet above ground level.

Non Foliar Applications

In some implementations, the compositions can be applied to a growing medium (e.g., soil) that is in proximity to a base and root system of the unwanted vegetation (e.g., weed, e.g., broadleaf weed), in which the amount of the composition that is applied to the growing medium is sufficient to penetrate the growing medium and contact the root tissue for uptake by the unwanted vegetation (e.g., weed, e.g., broadleaf weed).

As used herein, the term "growing medium" refers to any soil (of any composition) or soil-free (e.g. hydroponic) medium that is suitable for growing and cultivating a plant.

The growing medium can further include any naturally occurring and/or synthetic substance(s) that are suitable for growing and cultivating a plant.

In certain embodiments, the growing medium (e.g., soil) can include any surface of the growing medium that is from 0 inches to six feet (e.g., 0 inches to five feet, 0 inches to four feet, 0 inches to three feet, 0 inches to two feet, 0 inches to 12 inches, 0 inches to six inches, 0 inches to one inch, 0 inches to 0.5 inch) from the base of the unwanted vegetation (e.g., weed, e.g., broadleaf weed) and any growing medium that is from 0 inches to 24 inches beneath said surface of the growing medium. In other embodiments, the length of the surface of the growing medium can be determined on the basis of the height of the unwanted vegetation (e.g., weed, e.g., broadleaf weed), e.g., can correspond to the shade radius of the unwanted vegetation (e.g., weed, e.g., broadleaf weed), i.e., the distance around the plant that is shaded during daylight hours due to the height of the unwanted vegetation (e.g., weed, e.g., broadleaf weed).

In some embodiments, applying is carried out by soil drenching (e.g., by pouring the combinations described herein as a bolus on the surface of the growing medium or soaking a plant tray in the combinations described herein, e.g., root bathing).

In some embodiments, applying is carried out by drip irrigation.

In some embodiments, applying is carried out by soil injection.

In some embodiments, applying is carried out by granular application.

Total application volume with water is such that sufficient water is used to ensure good coverage of the treated area. In some embodiments, the compositions further include from 5 to 99 or 50 to 99 parts per weight of water. In certain embodiments, the compositions with water can be applied at a rate of from 100 gal/acre to 800 gal/acre (e.g., 200 gal/acre to 400 gal/acre).

In some embodiments, the compositions can be applied over a time period of at least ten seconds (e.g., at least five seconds, at least two seconds).

Additional Features(s) to Supplemental Foliar or Non Foliar Applications

In the above-described embodiments, application of any one (or more) compositions can be repeated one or more times. The various components (e.g., (1), (2) and/or (3)) can be applied separately, simultaneously, or any combination thereof. The components can be applied, for example, by spraying. In some embodiments, the various components (e.g., separately, together, or in various combinations) can be applied to the unwanted vegetation at a rate of from 1 gal per acre to 40 gal per acre.

The methods provided herein can further include selecting a site having the unwanted vegetation.

In some embodiments, the application methods described above can further include adding water (e.g., to the growing medium) after a composition has been applied. In certain embodiments, the methods can further include "watering in" the compositions. For example, the compositions can be applied first to a growing medium (e.g., soil) and then watered in with, e.g., 0.5 to 2 inches of water.

In some embodiments, the compositions are applied to golf courses (e.g., golf course fairways, tee boxes, and/or putting greens). In some embodiments, the compositions are applied to home lawns (i.e. residential lawns).

In some embodiments, "unwanted vegetation" includes weeds and unwanted plants, including dicotyledonous plants, monocotyledonous plants, conifers, cycads, ferns, horsetails, mosses, liverworts, and algae; e.g., common weeds such as dandelions (*Taraxacum officinale*), daisies (*Bellis perennis*), and chickweed (*Stellaria media*). In certain embodiments, unwanted vegetation can include without limitation one or more of the following:

Bedstraw
Bindweed (field)
Birdsfoot trefoil
Black medic
Blackseed plantain
Blueweed
Brambles
Broad-leaved plantain
Buckhorn plantain
Bull thistle
Burdock
Buttercup
Canada thistle
Carolina geranium
Chickweed
Chicory
Clover
Cocklebur
Common chickweed
Crudweed
Daisy fleabane
Dandelion
Devil's paint brush (hawkweed)
Dock (curled)
English daisy
Evening primrose
Fall dandelion (fall hawkbit)
False dandelion
Fleabane
Florida pusley
Grass leaved stitchwort
Ground ivy
Hawkweed
Heal-all
Henbit
Honeysuckle
Jimsonweed
Knotweed
Kochia
Kudzu
Lamb's-quarters
Little starwort
Mallow
Morningglory
Mouse-ear chickweed
Mustards
Narrow-leaved plantain
Oxalis (yellow woodsorrel)
Ox-eye daisy
Pennywort
Peppergrass
Pigweed
Pineapple weed
Plantains (narrow, buckhorn, broadleaf)
Poison ivy
Poorjoe
Povertyweed
Prostrate pigweed
Purslane
Ragweed
Russian thistle
Sandwort (thyme-leaved)
Sheep sorrel
Shepherd's purse
Smartweed (green)
Soliva
Sow thistle
Speedwell (purslane leaved)
Spotted spurge
Spreadwell (annual)
Spurge
Stitchwort
Stonecrop (mossy)
Sumac -continued Veronica (thyme-leaved)
Vervain
Vetch
Violet
Wild aster
Wild blackberry
Wild carrot
Wild garlic
Wild geranium
Wild lettuce
Wild onion
Wild radish
Wild raspberry
Yarrow
Yellow hawkweed In some embodiments, the desired vegetation is a turf grass.

In certain embodiments, the turf grass is one or more of: bentgrass, fine-leaf fescue, *Poa annua*, tall fescue, seashore paspalum, Bermudagrass, zoysiagrass, bahiagrass, centipedegrass, or St. Augustinegrass.

In certain embodiments, the turf grass is one or more of: bentgrass, bluegrass, ryegrass, fescue, bermudagrass, bahiagrass, zoysia, beachgrass, wheatgrass or carpetgrass.

In certain embodiments, the turf grass is one or more of: creeping bentgrass, colonial bentgrass, perennial ryegrass, annual ryegrass, Kentucky bluegrass, common bermudagrass, hybrid bermudagrass, annual bluegrass, seashore paspalum, St. Augustinegrass, tall fescue, bahiagrass, zoysiagrass, centipedegrass, rough stalk bluegrass, buffalo grass, blue grama, or annual bentgrass.

In certain embodiments, the turf grass is one or more of: creeping bentgrass or annual bluegrass.

In some embodiments, the compositions described herein can be prepared using the methods conventional methods known in the art. For example, the methods can include mixing (e.g., dissolving), e.g., IBA (or a salt thereof) into the solution of chelating agent then add in other adjuvants. As another example, the methods can include mixing (e.g., dissolving), e.g., IBA into alkali solution (such as KOH, $KHCO_3$, $K_2CO_3$, $NaH_2CO_3$). In some such embodiments, the IBA solution can then be combined with chelating agents and/or other adjuvants.

This disclosure also features herbicidal combinations that are useful, e.g., for controlling (e.g., reducing the population of, effectively eradicating) unwanted vegetation (e.g., a weed, e.g., a broadleaf weed; e.g., a broadleaf weed that typically occurs in the presence of desired vegetation (e.g., a turf grass), such as a dandelion). The herbicidal combinations include components (1), (2), and/or (3) delineated above, e.g., in which each of (1), (2), and/or (3) is separately packaged; or in which the components are combined (e.g., (1) and (2), (1) and (3), or (1), (2) and (3)), e.g., combined in the form of a composition (e.g., a ready to use dry or wet concentrate; or a less concentrated solution or mixture (e.g., a tank mix)). The combinations can further include one or more other components, e.g., one or more agriculturally suitable adjuvants and/or various amounts of water (e.g., for dilution).

Various implementations and examples of the compositions are described herein. These embodiments and examples are illustrative, and not limiting.

EXAMPLES

Provided herein are the following examples, which do not limit the scope of the invention described in the claims.

Example 1—Control of Dandelions in Greenhouse Study

Dandelions and Kentucky Bluegrass were seeded and grown in the greenhouse for at least 10 weeks before treatment. Ready-to-use formulations containing indole-3-butyric acid (IBA), Indole-3-acetic acid (IAA), penta sodium salt of diethylene triamine pentaacetic acid (DTPA Na5), N-(2-Hydroxyethyl)ethylenediamine-N,N',N'-triacetic acid trisodium salt (HEDTA Na3), and combinations of two or more of these components were prepared as detailed in Tables 1 and 2 with the remainder of the formulation being comprised of water (FIGS. 1 and 2). IBA and IAA were initially dissolved in $KHCO_3$ when the acid could not be dissolved directly (this is indicated below in Tables 1 and 2 by the label IBA-K or IAA-K) and then diluted in water to the concentration indicated. The prepared formulations were applied to sections of the dandelion and Kentucky Bluegrass plots at a rate of 200 gallons per acre (gpa).

Injuries to the grass and weeds were visually inspected and rated for 4 weeks using a 0-10 scale: 0=no injury; 10=plant dead. For turfgrass, ratings greater than 3 indicated unacceptable phytotoxicity.

As shown in Table 1 (FIG. 1), Tr 2 and Tr 3 showed that 1.5% IBA alone or 2% DTPA chelate alone had only a mild effect on dandelions. The combination of the two, however, exhibited a synergistic effect on killing the dandelions without inducing unacceptable phytotoxicity on the grass (see Tr 4). Tr 5-10 include additional adjuvants. Adjuvants further improved the efficacy of the IBA/DTPA combination or quickened the action of the formulation (note that the injury on dandelions on 6 days after application (DAT) was greater than Tr 4 without the addition of adjuvant). It is important to note, however, that in some cases, the certain combinations of adjuvants increased the injury to the turfgrass (see, e.g. Tr 10). In these cases, the formula acted as a non-selective herbicide. Tr 11-14 are examples of IBA+HEDTA, with and without other adjuvants.

Table 2 (FIG. 2) provides additional formulations. For example, Tr 2-6 are examples of IBA with different types of chelates that all provided good control on dandelions after 20 days. Tr 7-9 are examples of IBA+DTPA with varying levels of humectant. Tr 10-15 are examples of IBA+DTPA with different surfactants. In these examples, the addition of surfactants increased the efficiency of killing weeds but also made the formulations less selective (i.e. caused more damage to the grass).

Example 2—Control of Dandelions in Greenhouse Study

Dandelions and Kentucky Bluegrass were seeded and grown in the greenhouse for at least 10 weeks before treatment. Ready-to-use formulations containing indole-3-butyric acid (IBA) and ethylenediaminetetraacetic acid (EDTA), including ethylenediaminetetraacetic acid tetrasodium salt (EDTA Na4), ethylenediaminetetraacetic acid disodium salt (EDTA Na2), and ethylenediaminetetraacetic acid calcium sodium salt, and combinations of IBA and a chelator were prepared as detailed in Table 3 with the remainder of the formulation being comprised of water. IBA was initially dissolved in $KHCO_3$ when the acid could not be dissolved directly and then diluted in water to the concentration indicated (this is indicated below in Table 3 by the label IBA-K). The prepared formulations were applied to sections of the dandelion and Kentucky Bluegrass plots at a rate of 200 gallons per acre (gpa).

Injuries to the grass and weeds were visually inspected and rated for 4 weeks using a 0-10 scale: 0=no injury; 10=plant dead. For turfgrass, ratings greater than 3 indicated unacceptable phytotoxicity. The numbers indicate the maximum effect observed on the various plants. When regrowth of the plants following application was observed, it is noted in the table following the overall injury score.

As shown in Table 3 (FIG. 3), IBA or EDTA alone showed low to moderate control on weeds while the combination of IBA with EDTA showed significantly improved control on weeds compared with the untreated control plots. Specifically, Tr 2-4 showed that IBA alone has limited herbicidal effect at concentrations lower than 5% by weight. Concentrations of IBA greater than 5% by weight exhibited control of the weeds but also caused severe injury to the grass. This result indicates that formulations having high concentrations of IBA function well as nonselective herbicides. EDTA (tetrasodium salt, disodium salt and calcium disodium salt) tested alone had limited herbicidal effect at concentrations lower than 5% by weight. At concentrations greater than 5% by weight, the chelator burns the leaves of weeds, but the weeds were observed to grow back after 14 or 28 DAT (new shoots emerge from the roots). Such regrowth is considered unsuitable following application of an herbicide as only the tops or leaves of the plants are likely affected by the formulation while the roots remain viable for regrowth of the plants. Moreover, in addition to harming the weeds, formulations of chelator alone exhibited very little selectivity between grass and weeds. IBA (1.5%) combined with EDTA salts (<5%) showed a synergistic effect on weed control which significantly improved the efficacy of the formulation as compared to either component alone (i.e. a significant difference between the effect of the combination formulations on the grass and the weeds was observed at all data points tested), and provided a long lasting effect on weeds, with little to no regrowth of the weeds. Treatment 10, 12 and 14 also showed that IBA can be dissolved in EDTA-Na4 directly without addition of $KHCO_3$.

Example 3—Field Testing Control of Common Lawn Weeds in Florida

Formulas containing IBA and IAA, or their potassium salts, in combination with various chelating agents were prepared as described above and detailed in Table 4 the solutions were prepared in water at the concentrations indicated (FIG. 4). IBA was dissolved in $KHCO_3$ in the cases the acid could not be dissolved directly (labelled as IBA-K). The formulations were applied at a rate of 200 gpa onto sections of a Centipedegrass (ERLOP, BGRM, *Eremochloa* ophiuroides) lawn containing common broadleaf weeds. The tested plots were located in Florida, U.S.A. The weeds evaluated included:
Common dandelion: *Taraxacum officinale*
Greater Henbit: *Lamium amplexicaule*
Black medic: *Medicago lupulina*
Sticky chickweed: *Cerastium glomeratum*
Carolina geranium: *Geranium carolinianum*
Dichondra: *Dichondra repens*

Injuries to the grass and weeds were visually inspected and rated 24 hours following application of the formulations. Performance of the formulations was evaluated based on the percentage control of the weeds observed. This value was determined by quantifying the number of weeds present in each plot prior to application and then determining the number of weeds which were injured or killed to calculate the percentage control of each of the tested formulations.

As shown in Table 4 (FIG. 4), all of the formulations exhibited good control on the weeds as compared to untreated plots. This data indicates that the formulations tested are useful for treating plants in the field.

Example 4—Field Testing Control of Buckhorn Plantain in North Carolina

Various formulations of IBA, DTBA, and combinations of these two components were prepared in water as shown in Table 5. The formulations were applied at a rate of 200 gpa onto sections of a plot containing buckhorn plantains and other weeds in North Carolina, U.S.A. A second application of the formulations was made 21 days following the initial application.

The sections were visually inspected and rated over the course of 56 days following the initial application. Performance of the formulations was evaluated based on the percentage control of the buckhorn plantains observed in each section.

As shown in Table 5 (FIG. 5), DTPA alone showed moderate control on the buckhorn plantains, but the weeds began to exhibit regrowth after 25 days. The combination of IBA with DTPA showed significantly improved control on the buckhorn plantains even 56 days after application.

Example 5—Field Testing Control of Dandelions in Ontario

Formulations containing IBA, DTPA, and combinations of IBA with various chelating agents including salts of DTPA, EDTA, ethylenediamine-N,N'-disuccinic acid (EDDS), N-(hydroxyethyl)-ethylenediaminetriacetic acid (HEDTA), and lignosulfonic acid were prepared as detailed in Table 6 the solutions were prepared in water at the concentrations indicated (FIG. 4). The formulations were applied at a rate of 200 gpa onto sections of a plot containing dandelions and other weeds in Ontario, Canada.

Injuries to the grass and dandelions were visually inspected and rated 10 days and 30 days following application of the formulations. Performance of the formulations was evaluated based on the percentage of control of the dandelions observed. Injuries to the grass were also rated using a 0-10 scale: 0=no injury; 10=plant dead, severe injury.

As shown in Table 6 (FIG. 6), IBA or DTPA alone exhibited moderate control of the dandelions. In addition, the combination of IBA and an adjuvant (i.e. lignosulfonic acid) exhibited moderate control of the dandelions. The combination of IBA with a chelating agent showed significantly improved control on the dandelions as compared to the untreated sections.

Example 6—Weed control evaluation on mature perennial ryegrass

Evaluations were conducted on a stand of mature perennial ryegrass (*Lolium perenne* L.), to determine the efficacy of the formulas detailed in Table 7 for the control of dandelion (*Taraxacum officinale*), white clover (*Trifolium repens*), and buckhorn plantain (*Plantago lanceolata*) and the phytotoxicity of the formulation on perennial ryegrass. The formulations were prepared in water at the concentrations indicated (Table 7). In addition to IBA, potassium bicarbonate and chelator, a nutrient (urea) and an emulsifier (Tween) were included in the formulation.

All turfgrass test areas were rated by recording the population of dandelion, white clover, and buckhorn plantain species prior to the application of any treatment, on a plot by plot basis. The rating was conducted by way of visual inspection. This was repeated following the application of materials and a percent control of the population of each weed was observed and recorded. Injuries to the grass and weeds were visually inspected and rated over the course of the trial using a 0-10 scale: 0=no injury; 10=plant dead. The study was a randomized block design with three replications. Applications were applied twice, 16 September and 9 October, respectively. All applications were made using a three foot $CO_2$ powered boom sprayer calibrated to deliver 200 gpa of the formulations.

The test site was mowed weekly at three inches height with a rotary mower with clippings returned to the site. The test site was irrigated to prevent moisture stress.

TABLE 7

| Formulations tested |
| --- |
| Tr 1   1% IBA + 1% KHCO3 + 5% EDTA-Ca + 5% Urea + 0.5% Tween20 + 087.5% water |
| Tr 2   0.25% IBA + 0.25% KHCO3 + 5% EDTA-Ca + 5% Urea + 0.5% Tween20 + 89% water |

Perennial ryegrass phytotoxicity was rated four times during the study (Table 8). The control of dandelion, white clover, and buckhorn plantain was rated four times during the study (Tables 9-11). On the final rating date (13 October) all treated turfgrass revealed a significant reduction in the dandelion, white clover, and buckhorn plantain populations when compared to non-treated sections.

TABLE 8

Evaluations of perennial ryegrass phytotoxicity

| | (Perennial Rye Phyto) | | | |
|---|---|---|---|---|
| Treatment | 9/27 | 10/7 | 10/18 | 10/13 |
| Tr 1 | 2.7 | 2.0 | 0.0 | 0.0 |
| Tr 2 | 3.0 | 2.0 | 0.0 | 0.0 |
| UNTREATED CONTROL | 0.0 | 0.0 | 0.0 | 0.0 |

TABLE 9

Percent control of the dandelion.

| | (Dandelion Control [1]) | | | |
|---|---|---|---|---|
| Treatment | 9/27 | 10/7 | 10/18 | 10/13 |
| Tr 1 | 91.7 | 76.7 | 98.7 | 100.0 |
| Tr 2 | 73.5 | 85.9 | 88.6 | 93.3 |
| UNTREATED CONTROL | 0.0 | 0.0 | 0.0 | 0.0 |

TABLE 10

Percent control of the white clover populations.

| | (Clover Control [1]) | | | |
|---|---|---|---|---|
| Treatment | 9/27 | 10/7 | 10/18 | 10/13 |
| Tr 1 | 65.4 | 62.4 | 90.3 | 89.7 |
| Tr 2 | 53.3 | 43.3 | 42.7 | 53.3 |
| UNTREATED CONTROL | 0.0 | 0.0 | 0.0 | 0.0 |

TABLE 11

Percent control of the buckhorn plantain populations

| | (Plantain Control [1]) | | | |
|---|---|---|---|---|
| Treatment | 9/27 | 10/7 | 10/18 | 10/13 |
| Tr 1 | 100.0 | 93.3 | 93.3 | 100.0 |
| Tr 2 | 66.7 | 100.0 | 100.0 | 100.0 |
| UNTREATED CONTROL | 0.0 | 0.0 | 0.0 | 0.0 |

Example 7. Broadleaf Weed Control on Turfgrass

Plots were located on an area of established turf (predominantly turf-type perennial ryegrass, infested with dandelion, clover, and other lawn weeds). Turf was maintained with typical medium maintenance turf regime: 1.0 kg actual N 100 $m^{-2}$ per year in three applications (spring, summer, dormant); P and K in a 4:1:4 ratio with N; irrigated to prevent stress prior to treatment application and to prevent dormancy thereafter; grass was mowed at 3 inches height.

The formulations detailed in Table 12 were examined. The formulations were prepared in water at the concentrations indicated (Table 12). In addition to IBA, potassium bicarbonate and chelator, a nutrient (urea), an emulsifier (Tween), and a polymer (polyacrylic acid) were included in the formulation. Each treatment was replicated four times in 1×2 m plots arranged in a randomized complete block design. Treatments were applied on September 12, and then reapplied three weeks after the first application (October 3).

TABLE 12

| Tr 1 | 0.25% IBA + 0.25% KHCO3 + 5% EDTA-Ca + 5% Urea + 0.5% Tween20 + 2% polyacrylic acid + 87% water |
| Tr 2 | 1% IBA + 1% KHCO3 + 5% EDTA-Ca + 5% Urea + 0.5% Tween20 + 2% polyacrylic acid + 85.5% water |

Plots were rated pre-treatment for weed presence by visual inspection of broadleaf weed density and point quadrat measurement of weed cover. Post-treatment measurements of weeds were taken at 2-3 weeks after treatment and later in the season. Plots were rated visually and using canopy reflectance (normalized-difference vegetation index) 2-3 days after treatment for phytotoxicity of treatments to broadleaf weeds and to grasses. Injuries to the grass and weeds were visually inspected and rated over the course of the trial using a 0-10 scale: 0=no injury; 3=unacceptable phytotoxicity damage; 10=plant dead.

The phytotoxicity on grass post-treatment was rated on 1 DAT and 14 DAT, as shown in Table 13.

TABLE 13

Evaluations of grass phytotoxicity

| Treatment | 9/13 | 9/26 |
|---|---|---|
| Tr 1 | 0.0 | 0.5 |
| Tr 2 | 0.0 | 1.0 |
| UNTREATED CONTROL | 0.0 | 0.0 |

The coverage of Broadleaf weed infestation in the plot area before treatment was about 38% of the area, as estimated by point-quadrat counts. Most of the weeds present were dandelion and clover, with smaller amounts of black medic and birdsfoot trefoil. Other sporadic weeds which were included in the total weed counts were broadleaf plantain, narrowleaf plantain, and chickweed. Percent control of the total weed population is shown in Table 14.

TABLE 14

Percent control of total weeds.

| | (Total weed Control) | |
|---|---|---|
| Treatment | 10/02 | 10/30 |
| Tr 1 | 58.2 | 86.5 |
| Tr 2 | 71.4 | 87.9 |
| UNTREATED CONTROL | 0.0 | 0.0 |

The treatments provided broadleaf weed control of all the target species. Six weeks after the first application of the formulations, the average weed cover in treated plots was reduced to about 3% from the initial coverage of about 38%.

Example 8—Control of Dandelions on Home Lawn Grass

Formulations of IBA alone were evaluated. This trial was conducted in British Columbia, Canada on established home lawn grass. The plots were 2 meters long and 1 meter wide. There were guard plots at the end of each replicate. Application of the formulations detailed in Tables 15 and 16 were made May 10. Flat Fan Teejet nozzles were used. Equipment was calibrated prior to the first application. Treatments were sprayed at 940 liters per hectare (L/ha) water volume.

A pre-application weed assessment was conducted to provide a base line dandelion population. Turf tolerance to the formulations and the efficacy of the formulations on the dandelion population were assessed at 0, 8, 17, 23, 31, and 42 days after application. It is noted that the beginning of the growing season in the test year had above normal rainfall observed in April, May, and July. June and August had below normal rainfall. No adverse weather conditions were observed.

Phytotoxicity to the grass was rated over the course of the trial using a percentage scale: 0=no observed phytotoxicity; 10=unacceptable phytotoxicity damage; 100=dead grass.

As shown in Tables 15 and 16, IBA formulated with adjuvant (paraffin oil and alcohol ethoxylate) provided effective treatment of dandelions on home lawn grass.

Example 9—Solubility of IBA

The solubility of IBA and its salts was investigated in various aqueous solutions under different pH conditions. The effect of chelators such as EDTA and HEDTA on the solubility of IBA was also investigated. The solutions tested are shown in Table 17. The data provided further evidence of the relatively limited water solubility of the IBA acid (<0.1%). It was found, however, that a 1% solution of IBA dissolves well under alkaline conditions and was stable at pH>6.

TABLE 15

Phytotoxicity ratings on grass (%).

| | | Rating Type | | | | | |
|---|---|---|---|---|---|---|---|
| | | PHYGEN | PHYGEN | PHYGEN | PHYGEN | PHYGEN | PHYGEN |
| | | | | Rating Unit | | | |
| | | % | % | % | % | % | % |
| Trt | | | | Days after treatment | | | |
| No. | Treatment | 0 DAT | 8 DAT | 17 DAT | 23 DAT | 31 DAT | 42 DAT |
| 1 | Untreated Check | 0.0 | 0.0 | 0.0 | 0.0 | 0.0 | 0.0 |
| 2 | 5% IBA+ 6.2% $K_2CO_3$ + 8% paraffin oil + 2% alcohol ethoxylate | 0.0 | 0.8 | 2.0 | 0.0 | 0.0 | 0.0 |
| 3 | 5% IBA+ 6.2% $K_2CO_3$ + 1% alcohol ethoxylate | 0.0 | 0.0 | 5.0 | 0.0 | 0.0 | 0.0 |
| 4 | 2.5% IBA + 3.5% $K_2CO_3$ + 1% alcohol ethoxylate | 0.0 | 0.0 | 1.5 | 0.0 | 0.0 | 0.0 |
| 5 | KILLEX ® | 0.0 | 0.0 | 0.0 | 0.0 | 0.0 | 0.0 |

TABLE 16

Control of Dandelions (%)

| | | Rating Type | | | | | |
|---|---|---|---|---|---|---|---|
| | | CONTRO | CONTRO | CONTRO | CONTRO | CONTRO | CONTRO |
| | | | | Rating Unit | | | |
| | | % | % | % | % | % | % |
| | | | | Days after application | | | |
| Trt | Treatment | 0 DAT | 8 DAT | 17 DAT | 23 DAT | 31 DAT | 42 DAT |
| 1 | Untreated Check | 0.0 | 0.0 | 0.0 | 0.0 | 0.0 | 0.0 |
| 2 | 5% IBA + 6.2% $K_2CO_3$ + 8% paraffin oil + 2% alcohol ethoxylate | 0.0 | 86.3 | 87.5 | 93.8 | 86.3 | 76.3 |
| 3 | 5% IBA + 6.2% $K_2CO_3$ + 1% alcohol ethoxylate | 0.0 | 77.5 | 73.8 | 85.0 | 70.0 | 71.3 |
| 4 | 2.5% IBA + 3.5% $K_2CO_3$ + 1% alcohol ethoxylate | 0.0 | 65.0 | 65.0 | 76.3 | 63.8 | 55.0 |
| 5 | Killex | 0.0 | 3.8 | 76.3 | 93.8 | 98.8 | 100.0 |

TABLE 17

| Sample# | Solution | Solubility | pH | pH that solid drop-out |
|---|---|---|---|---|
| 1 | 1% IBA-Acid + 99% water | Insoluble | 3.42 | |
| 2 | 1% IBA-Acid + 9% Isopropyl Alcohol + 90% water | Insoluble | 3.67 | |
| 3 | 1% IBA-Acid + 5% EDTA-Na2 + 94% water | Insoluble | 4.56 | |
| 4 | 1% IBA-Acid + 1.5% FeHEDTA + 97.5% water | Insoluble | 4.86 | |
| 5 | 1% IBA-Acid + 5% EDTA-CaNa2 + 94% water | Insoluble | 5.54 | |
| 6 | 1% IBA-Acid + 0.9% KHCO3 + 98.9% water | Soluble | 8.54 | 5.47 |
| 7 | 1% IBA-Acid + 0.9% KHCO3 + 5% EDTA-Ca + 94.1% water | Soluble | 8.57 | 5.76 |
| 8 | 1% IBA-Acid + 5% EDTA-Na4 + 94% water | Soluble | 9.56 | 5.00 |
| 9 | 1% IBA-Acid + 0.5% KOH + 98.5% water | Soluble | 12.08 | 5.70 |
| 10 | 1% IBA Potassium Salt + 99% water | Soluble | 8.50 | 5.77 |
| 11 | 1% IBA-Acid + 0.9% KHCO3 + 1.35% FeHEDTA | Soluble | 7.47 | 5.40 |

Example 10—Root Damage Study

The effect of various chelator and IBA formulations were evaluated to determine their effect on the roots of dandelions. Dandelions were seeded and grown in a greenhouse for 10 weeks before treatment. Ready-to-use formulations were prepared as detailed in Table 18. The IBA was initially dissolved in KHCO$_3$ when the acid could not be dissolved directly (this is indicated below in Table 18 by the label IBA-K). The prepared formulations were applied the dandelions at a rate of 200 gallons per acre (gpa).

Injuries to the dandelions were visually inspected and rated for 4 weeks using a 0-10 scale: 0=no injury; 10=plant dead. The roots of the dandelions were examined at the end of the study.

As shown in Table 18 (FIG. 7), chelate alone only caused topical damage to the weeds (e.g., leaf burn), but the roots remained healthy and the dandelions grew back during the course of the study. The combination of IBA and chelate, however, exhibited good weed control, causing damage to both the leaves and the roots which leads to complete plant death or significant root damage such that the weeds are hard to grow back.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A broadleaf weed herbicidal composition, comprising:
 (1) one or more natural indole auxins, or an agriculturally suitable salt thereof, wherein the one or more natural indole auxins are selected from the group consisting of: indole-3-acetic acid or an agriculturally suitable salt thereof, indole-3-butyric acid or an agriculturally suitable salt thereof, and indole-3-propionic acid or an agriculturally suitable salt thereof;
 (2) one or more chelating agents comprising an aminopolycarboxylic acid or an agriculturally suitable salt thereof; and
 (3) one or more emulsifiers;
 wherein (1) is present in an amount of about 0.5 to about 5% by weight of the composition,
 wherein the weight ratio of (1):(2) is from 1:1 to 1:5; and
 wherein the broadleaf weed herbicidal composition is selectively toxic to broadleaf weeds and less toxic to turf grasses.

2. The composition of claim 1, wherein (1) is indole-3-butyric acid or an agriculturally suitable salt thereof.

3. The composition according to claim 1, wherein the aminopolycarboxylic acid is ethylenediaminetetraacetic acid (EDTA), diethylenetriaminepentaacetic acid (DTPA), hydroxyethylenediaminetriacetic acid (HEDTA), ethylenediaminedisuccinate (EDDS) or an agriculturally acceptable salt thereof.

4. The composition according to claim 3, wherein the aminopolycarboxylic acid is ethylenediaminetetraacetic acid (EDTA) or an agriculturally acceptable salt thereof.

5. The composition according to claim 1, wherein (2) is present in an amount of about 0.1 to about 10% by weight of the composition.

6. The composition according to claim 1, wherein the composition comprises at least 50 weight percent of (1) and (2).

7. The composition according to claim 1, wherein (3) comprises an alcohol ethoxylate, an alcohol alkoxylate, an alkyl polysaccharide, a glycerol oleate, a polyoxyethylene-polyoxypropylene block copolymer, an alkyl phenol ethoxylate, a polymeric surfactant, a polyethylene glycol, a sorbitan fatty acid ester ethoxylate, or any combination thereof.

8. The composition according to claim 1, wherein (3) comprises a sorbitan fatty acid ester ethoxylate.

9. The composition according to claim 1, wherein the composition further comprises one or more agriculturally suitable adjuvants.

10. The composition of claim 9, wherein each of the one or more agriculturally suitable adjuvants is independently selected from the group consisting of a humectant, a penetrant, a pigment, and a wetting or spreading agent.

11. The composition according to claim 9, wherein each of the one or more agriculturally suitable adjuvants is independently selected from the group consisting of a polyethylene glycol, a polypropylene glycol, propylene glycol, and an oil adjuvant.

12. The composition according to claim 9, wherein the weight ratio of (1):the one or more agriculturally suitable adjuvants is from 1:1 to 1:50.

13. The composition according to claim 1, wherein the composition comprises:
   (1) indole-3-butyric acid or an agriculturally suitable salt thereof;
   (2) ethylenediaminetetraacetic acid (EDTA) or an agriculturally suitable salt thereof; and
   (3) a sorbitan fatty acid ester ethoxylate emulsifier.

14. The composition according to claim 13, wherein the composition comprises at least 50 weight percent of (1), (2), and further comprises one or more agriculturally suitable adjuvants.

15. The composition according to claim 1, wherein the composition is substantially free of water.

16. The composition according to claim 1, wherein the composition further comprises water.

17. A broadleaf weed herbicidal composition, comprising:
   (1) indole-3-butyric acid or an agriculturally suitable salt thereof;
   (2) ethylenediaminetetraacetic acid (EDTA) or an agriculturally suitable salt thereof; and
   (3) a sorbitan fatty acid ester ethoxylate emulsifier;
   wherein (1) is present in an amount of about 0.5 to about 5% by weight of the composition;
   wherein (2) is present in an amount of up to about 10% by weight of the composition;
   wherein the weight ratio of (1):(2) is from 1:1 to 1:5; and
   wherein the broadleaf weed herbicidal composition is selectively toxic to broadleaf weeds and less toxic to turf grasses.

18. A method for selectively controlling broadleaf weeds on a turfgrass, which comprises applying, in combination:
   (1) one or more natural indole auxins, or an agriculturally suitable salt thereof, wherein the one or more natural indole auxins are selected from the group consisting of: indole-3-acetic acid or an agriculturally suitable salt thereof, indole-3-butyric acid or an agriculturally suitable salt thereof, and indole-3-propionic acid or an agriculturally suitable salt thereof;
   (2) one or more chelating agents comprising an aminopolycarboxylic acid or an agriculturally suitable salt thereof; and
   (3) one or more emulsifiers;
   to the broadleaf weeds and to the turfgrass, and/or to a growing medium that is in proximity to a base and root system of the broadleaf weeds and the turfgrass;
   wherein (1) is present in an amount of about 0.5 to about 5% by weight of the composition;
   wherein the weight ratio of (1):(2) is from 1:1 to 1:5; and
   wherein the combination is selectively toxic to broadleaf weeds and less toxic to turf grasses.

19. The method of claim 18, wherein the composition comprises:
   (1) indole-3-butyric acid or an agriculturally suitable salt thereof;
   (2) ethylenediaminetetraacetic acid (EDTA) or an agriculturally suitable salt thereof; and
   (3) a sorbitan fatty acid ester ethoxylate emulsifier.

\* \* \* \* \*